(12) United States Patent
Watson et al.

(10) Patent No.: US 6,529,811 B2
(45) Date of Patent: Mar. 4, 2003

(54) VEHICLE ROLLOVER DETECTION SYSTEM

(75) Inventors: W. Todd Watson, Belleville, MI (US); Alan J. Riggs, Ann Arbor, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/082,531

(22) Filed: Mar. 1, 2002

(65) Prior Publication Data

US 2002/0152012 A1 Oct. 17, 2002

Related U.S. Application Data

(60) Provisional application No. 60/272,611, filed on Mar. 1, 2001.

(51) Int. Cl.[7] .............................................. B60R 22/00
(52) U.S. Cl. ................................ 701/45; 701/36; 701/1
(58) Field of Search ............................. 701/45, 36, 37, 701/41, 1; 180/271; 280/734, 735

(56) References Cited

U.S. PATENT DOCUMENTS

| | | | |
|---|---|---|---|
| 3,719,246 A | 3/1973 | Bott ........................... | 180/103 |
| 3,899,028 A | 8/1975 | Morris et al. ................ | 172/4.5 |
| 4,038,876 A | 8/1977 | Morris ........................ | 73/432 |
| 4,470,124 A | 9/1984 | Tagami et al. .............. | 364/571 |
| 4,592,565 A | 6/1986 | Eagle .......................... | 280/432 |
| 4,691,798 A | 9/1987 | Engelbach .................. | 180/209 |
| 5,065,612 A | 11/1991 | Ooka et al. ....................... | 73/1 |
| 5,115,238 A | 5/1992 | Shimizu et al. ............. | 340/988 |
| 5,125,472 A | 6/1992 | Hara ........................... | 180/271 |
| 5,172,323 A | 12/1992 | Schmidt ..................... | 364/453 |
| 5,203,600 A | 4/1993 | Watanabe et al. .......... | 296/68.1 |
| 5,218,771 A | 6/1993 | Redford ........................ | 33/366 |
| 5,233,213 A | 8/1993 | Marek ......................... | 257/415 |
| 5,261,506 A | 11/1993 | Jost ............................. | 180/282 |

(List continued on next page.)

OTHER PUBLICATIONS

"Gyrostar Piezoelectric Vibrating Gyroscope," ENV–05H–02 Series, Murata.

Z. Zurong and S. Cunli, "Principle and Application of a QCW–1A Controllability–Stability Tester for Automobiles," SAE Paper #931973, Seventh International Pacific Conference and Exposition on Automotive Engineering, Phoenix, Arizona, Nov. 15–19, 1993.

A. G. Nalecz; A. C. Bindemann; and C. Bare, "Sensitivity Analysis of Vehicle Tripped Rollover Model", Report DOT HS 807 300, NHTSA, Jul., 1988.

W.R. Garrott, "Rollover Research Activities at the Vehicle Research and Test Center—Frequency Response Testing", Report DOT HS 807 993, NHTSA, Jun., 1992.

W.R. Garrott; J.G. Howe; and G. Forkenbrock, "An Experimental Examination of Selected Maneuvers That May Induce On–Road Untripped, Light Vehicle Rollover—Phase II of NHTSA's 199701998 Vehicle Rollover Research Program", Report VRTC–86–0421, NHTSA, Jul., 1999.

Primary Examiner—Richard M. Camby
(74) Attorney, Agent, or Firm—Dinnin & Dunn, P.C.

(57) ABSTRACT

A rollover condition is detected responsive to the comparison of a figure of merit with a threshold, wherein the threshold is given generally as a function of a period of time commencing with a time of inception determined from one or both of a measure of lateral acceleration and a measure of angular velocity. The measures of lateral acceleration and angular velocity are filtered, and are compensated to remove offset errors. In one embodiment, the figure of merit comprises a measure function that incorporates a damping term and a product term. The product term comprises a force measure and a kinetic energy measure, wherein the force measure is responsive to the measure of lateral acceleration, and the kinetic energy measure is responsive to the measure of angular velocity. The product term may further comprise a potential energy measure that is responsive to a measure of roll angle.

70 Claims, 14 Drawing Sheets

U.S. PATENT DOCUMENTS

| Patent No. | | Date | Inventor(s) | Class |
|---|---|---|---|---|
| 5,270,959 | A | 12/1993 | Matsuzaki et al. | 364/571.02 |
| 5,337,238 | A | 8/1994 | Gioutsos et al. | 364/424.05 |
| 5,359,515 | A | 10/1994 | Weller et al. | 364/424.05 |
| 5,363,302 | A | 11/1994 | Allen et al. | 364/424.05 |
| 5,369,580 | A | 11/1994 | Monji et al. | 364/424.01 |
| 5,375,336 | A | 12/1994 | Nakamura | 33/324 |
| 5,413,378 | A | 5/1995 | Steffens, Jr. et al. | 280/735 |
| 5,451,094 | A | 9/1995 | Templin et al. | 297/216.17 |
| 5,492,368 | A | 2/1996 | Pywell et al. | 280/806 |
| 5,508,918 | A | 4/1996 | Gioutsos | 364/424.05 |
| 5,573,269 | A | 11/1996 | Gentry et al. | 280/735 |
| 5,590,736 | A | 1/1997 | Morris et al. | 180/282 |
| 5,602,734 | A | 2/1997 | Kithil | 364/424.055 |
| 5,610,575 | A | 3/1997 | Gioutsos | 340/429 |
| 5,626,359 | A | 5/1997 | Steffens, Jr. et al. | 280/735 |
| 5,646,454 | A | 7/1997 | Mattes et al. | 307/10.1 |
| 5,673,932 | A | 10/1997 | Nitschke et al. | 280/735 |
| 5,684,336 | A | 11/1997 | McCurdy | 307/10.1 |
| 5,684,701 | A | 11/1997 | Breed | 364/424.055 |
| 5,699,256 | A | 12/1997 | Shibuya et al. | 364/453 |
| 5,742,916 | A | 4/1998 | Bischoff et al. | 701/45 |
| 5,755,978 | A | 5/1998 | Newell et al. | 216/33 |
| 5,796,002 | A | 8/1998 | Layton | 73/504.16 |
| 5,825,284 | A | 10/1998 | Dunwoody | 340/440 |
| 5,864,768 | A | 1/1999 | Bieber et al. | 701/38 |
| 5,890,084 | A | 3/1999 | Halasz et al. | 701/45 |
| 5,948,027 | A | 9/1999 | Oliver, Jr. et al. | 701/37 |
| 5,948,028 | A | 9/1999 | Raad et al. | 701/37 |
| 5,977,653 | A | 11/1999 | Schmid et al. | 307/10.1 |
| 6,002,974 | A | 12/1999 | Schiffmann | 701/36 |
| 6,002,975 | A | 12/1999 | Schiffmann et al. | 701/36 |
| 6,036,225 | A | 3/2000 | Foo et al. | 280/735 |
| 6,038,495 | A | 3/2000 | Schiffmann | 701/1 |
| 6,047,229 | A | 4/2000 | Ishikawa | 701/50.414 |
| 6,055,472 | A | 4/2000 | Breunig et al. | 701/45 |
| 6,065,558 | A | 5/2000 | Wielenga | 180/282 |
| 6,070,681 | A | 6/2000 | Catanzarite et al. | 180/89.15 |
| 6,076,027 | A | 6/2000 | Raad et al. | 701/38 |
| 6,095,554 | A | 8/2000 | Foo et al. | 280/735 |
| 6,104,284 | A | 8/2000 | Otsuka | 340/440 |
| 6,141,604 | A | 10/2000 | Mattes et al. | 701/1 |
| 6,157,295 | A | 12/2000 | Steiner et al. | 340/440 |
| 6,169,946 | B1 | 1/2001 | Griessbach | 701/45 |
| 6,170,594 | B1 | 1/2001 | Gilbert | 180/282 |
| 6,186,539 | B1 | 2/2001 | Foo et al. | 280/735 |
| 6,192,305 | B1 | 2/2001 | Schiffmann | 701/45 |
| 6,212,455 | B1 | 4/2001 | Weaver | 701/45 |
| 6,225,894 | B1 | 5/2001 | Kyrtsos | 340/440 |
| 6,259,982 | B1 | 7/2001 | Williams et al. | 701/38 |
| 6,262,658 | B1 | 7/2001 | O'Connor | 340/440 |
| 6,263,261 | B1 | 7/2001 | Brown et al. | 701/1 |
| 6,264,212 | B1 | 7/2001 | Timoney | 280/5.51 |
| 6,282,474 | B1 | 8/2001 | Chou et al. | 701/45 |
| 6,292,759 | B1 | 9/2001 | Schiffman | 702/151 |
| 6,332,104 | B1 | 12/2001 | Brown et al. | 701/1 |
| 6,341,252 | B1 | 1/2002 | Foo et al. | 701/45 |
| 2001/0048215 | A1 | 12/2001 | Breed et al. | 280/728.1 |

Fig. 8a

| | MEASURES ALGORITHM (xxx.1) | ENERGY ALGORITHM (xxx.2) |
|---|---|---|
| ONGOING_EVENT_FLAG (306) | ONGOING_MEASURES_EVENT_FLAG | ONGOING_ENERGY_EVENT_FLAG |
| Entrance Criteria (302) | $\left\|\tilde{A}_y(t) - \tilde{A}_y^{Offset}(t)\right\| > A_y^{Thr\_1}$ | a. $\left\|\tilde{A}_y(t) - \tilde{A}_y^{Offset}(t)\right\| > A_y^{Thr\_1}$ OR<br>b. $\left\|\tilde{\omega}_x(t) - \tilde{\omega}_x^{Offset}(t)\right\| > \omega_x^{Thr\_1}$ |
| Exit Criteria (322) | $\Delta t^M(n^M) > \Delta t_{max}^M$ | a. $\Delta t^E(n^E) > \Delta t_{max}^E$ OR<br>b1. $\Delta t^E(n^E) > \Delta t_{min}^E$ AND<br>b2. $\Delta t^E(n^E) - \Delta t^{E*} > \Delta t_{Event}^E$ |
| Algorithm Initialization (310) | a. $n^M = 0$<br>b. $t^M(-1) = t^M(0) = t$<br>c. $\Delta t^M(0) = 0$<br>d. $\theta^M(-1) = 0$<br>e. $R(-1) = 0$ | a. $n^E = 0$<br>b. $t^E(-1) = t^E(0) = t$<br>c. $\Delta t^E(0) = 0$<br>d. $\theta^E(-1) = 0$<br>e. $n_\omega^E = 0$<br>f. $\Delta t^{E*} = 0$ |
| Measure of Time (312) | a. $n^M$++<br>b. $t^M(n^M) = t$<br>c. Time since algorithm entrance<br>$\Delta t^M(n^M) = t^M(n^M) - t^M(0)$ | a. $n^E$++<br>b. $t^E(n^E) = t$<br>c. Time since algorithm entrance<br>$\Delta t^E(n^E) = t^E(n^E) - t^E(0)$ |

| Safing Criteria (200) | a. $\left\|\tilde{A}_y(t) - \tilde{A}_y^{Offset}(t)\right\| > A_y^{Thr\_3}$ for any t during either a Measures Event or an Energy Event (ACCELERATION_SAFING_EVENT_FLAG) AND<br>b. $\left\|\tilde{\omega}_x(t) - \tilde{\omega}_x^{Offset}(t)\right\| > \omega_x^{Thr\_3}$ for any t during either a Measures Event or an Energy Event (ROLL_SAFING_EVENT_FLAG) |
|---|---|

Fig. 8b

| | MEASURES ALGORITHM (xxx.1) | ENERGY ALGORITHM (xxx.2) |
|---|---|---|
| Algorithm Calculations (326) | a. Sample interval<br>$dt = t^M(n^M) - t^M(n^M - 1)$<br><br>b. Acceleration sampling and offset compensation<br>$\tilde{A}'_y(n^M) = \tilde{A}_y(t) - \tilde{A}_y^{Offset}(t)$<br><br>c. Roll rate sampling and offset compensation<br>$\tilde{\omega}'_x(n^M) = \tilde{\omega}_x(t) - \tilde{\omega}_x^{Offset}(t)$<br><br>d. Roll angle from integration of roll rate<br>$\theta^M(n^M) = \theta^M(n^M - 1) + \tilde{\omega}'_x(n^M) \cdot dt$<br><br>e. Force Measure<br>$F^* = \tilde{A}'_y(n^M)$<br><br>f. Rotational Kinetic Energy Measure<br>$KE^* = \tilde{\omega}'^2_x(n^M)$<br><br>g. Potential Energy Measure<br>$PE^* = sign(\tilde{\omega}'_x(n^M)) \cdot \theta_0 + \theta^M(n^M)$<br><br>h. Measure Function<br>$R(n^M) = R(n^M - 1) \cdot (1 - \frac{\Delta t^M}{\tau}) + F^* \cdot KE^* \cdot PE^*$<br><br>i. Figure of Merit<br>$FOM(n^M) = |R(n^M)| \cdot (|R(n^M)| - |R(n^M - 1)|)$ | a. Sample interval<br>$dt = t^E(n^E) - t^E(n^E - 1)$<br><br>b. Acceleration sampling and offset compensation<br>$\tilde{A}'_y(n^E) = \tilde{A}_y(t) - \tilde{A}_y^{Offset}(t)$<br><br>c. Roll rate sampling and offset compensation<br>$\tilde{\omega}'_x(n^E) = \tilde{\omega}_x(t) - \tilde{\omega}_x^{Offset}(t)$<br><br>d. Roll angle from integration of roll rate<br>$\theta^E(n^E) = \theta^E(n^E - 1) + \tilde{\omega}'_x(n^E) \cdot dt$<br><br>e. Compensation for roll oscillation effect<br>if $sign(\tilde{\omega}'_x(n^E)) \neq sign(\tilde{\omega}'_x(n^E - 1))$ then<br>$\theta^E(n^E) = \theta^E(n^E - 1) \cdot MAX\left(\frac{1024 - (n^E - n_\omega^E)}{1024}, 0.5\right)$<br>$n_\omega^E = n^E$<br><br>f. Exit Criteria Basis<br>if $\|\tilde{A}'_y(n^E)\| > A_y^{Thr-1}$ OR<br>$\|\tilde{\omega}'_x(n^E)\| > \omega_x^{Thr-1}$ then $\Delta t^{E*} = \Delta t^E$ |

Fig. 8c

| | MEASURES ALGORITHM (xxx.1) | ENERGY ALGORITHM (xxx.2) |
|---|---|---|
| Algorithm Detection Criteria (330) | a. Figure of Merit Threshold<br>$FOM^{Thr}(\Delta t^M) = A \cdot \Delta t^M + B$<br>b1. $\Delta t_{min}^M \leq \Delta t^M \leq \Delta t_{max}^M$ AND<br>b2. $FOM(n^M) > FOM^{Thr}(\Delta t^M)$ AND<br>b3. $\|FOM(n^M)\| > \|FOM(n^M - 1)\|$ AND<br>b4. $\|FOM(n^M)\| > \|FOM(n^M - m)\|$ AND<br>b5. $\|\bar{A}'_y(n^M)\| > A_y^{Thr\_2}$ AND<br>b6. $\|\bar{\omega}'_x(n^M)\| > \omega^{Thr\_2}$ | a. Identification of Energy Threshold Segment<br>$k = k \ni \theta_k \leq \theta^E < \theta_{k+1}$<br>b. Distance from Energy Threshold Segment in phase space<br>$D(\bar{\omega}'_x, \theta^E, n^E, k) = \dfrac{\left[(\omega_{k+1} - \omega_k) \cdot (\theta^E(n^E) - \theta_k) - (\theta_{k+1} - \theta_k) \cdot (\|\bar{\omega}'_x(n^E)\| - \omega_k)\right]}{\sqrt{(\theta_{k+1} - \theta_k)^2 + (\omega_{k+1} - \omega_k)^2}}$<br>c. Slope of trajectory in phase space<br>$Slope(n^E) = \dfrac{\bar{\omega}'_x(n^E) - \bar{\omega}'_x(n^E - 1)}{\theta^E(n^E) - \theta^E(n^E - 1)}$<br>d. $\beta = \tan^{-1}\left(Slope(n^E) \cdot \dfrac{180}{\pi}\right)$<br>e1. $\beta^{min} < \beta < \beta^{max}$ AND<br>e2. $\|\bar{\omega}'_x(n^E)\| - \|\bar{\omega}'_x(n^E - 1)\| > 0$ AND<br>e3. $D(\bar{\omega}'_x, \theta^E, n^E, k) < 0$ AND<br>e4. $\|\theta^E\| > \theta^{Thr}$<br>OR<br>f1. $D(\bar{\omega}'_x, \theta^E, n^E, k) < D^{Thr}$ AND<br>f2. $\|\theta^E\| > \theta^{Thr}$ |

Fig. 9a

| Step | Parameter | Value | Algorithm |
|---|---|---|---|
| Data Acquisition & Preprocessing (150) | $dt$ | 0.4 msec | Data Acquisition |
| | $A_Y^{max}$ | Min(20 g, \|range of accelerometer\|) | Clipping |
| | $\omega_x^{max}$ | Min(300 deg/sec, \|range of angular velocity sensor\|) | |
| | $T_{Avg\_Offset}$ | 4 sec | Filtering |
| | $T_{Avg}$ | 12.8 msec | |
| Entrance Criteria (306) | $A_Y^{Thr\_1}$ | 1.4 g | Measures & Energy |
| | $\omega^{Thr\_1}$ | 19 deg/sec | Energy |
| Exit Criteria (322) | $\Delta t_{max}^M$ | 165 msec | Measures |
| | $\Delta t_{min}^E$ | 4 sec | Energy |
| | $\Delta t_{max}^E$ | 12 sec | |
| | $\Delta t_{Event}^E$ | 2 sec | |
| Algorithm Calculations (326) | $\theta_0$ | 0.1 deg | Measures |
| | $\tau$ | 400 sec | |
| Algorithm Detection Criteria (330) | $A$ | 6.46E11 (g²deg⁶/ms/s⁴) \| 40 ms < t < 96 ms<br>2.59E11 (g²deg⁶/ms/s⁴) \| 96 ms < t < 165 ms | Measures |
| | $B$ | -2.34E13 (g²deg⁶/s⁴) \| 40 ms < t < 96 ms<br>-1.36E13 (g²deg⁶/s⁴) \| 96 ms < t < 165 ms | |
| | $\Delta t_{min}^M$ | 40 msec | |
| | $\Delta t_{max}^M$ | 165 msec | |
| | $m$ | 6 | |
| | $A_Y^{Thr\_2}$ | 0.7 g | |
| | $\omega^{Thr\_2}$ | 50 deg/sec | |
| | $\theta_k$ | Experimentally Determined | |
| | $\omega_k$ | Experimentally Determined | |
| | $\beta^{min}$ | 75 deg | Energy |
| | $\beta^{max}$ | 90 deg | |
| | $D^{Thr}$ | $-2.5 \sqrt{\deg^2 + (\deg/\sec)^2}$ | |
| | $\theta^{Thr}$ | 10 deg | |

Fig. 9b

| Step | Parameter | Value | Algorithm |
|---|---|---|---|
| Sensor Recalibration Criteria (400) | $\omega_x^{Thr\_4}$ | 0.8 * max range of roll gyro measurement (e.g. $\omega_x^{Thr\_4} = 250$ deg/sec) | Measures & Energy |
| | $\Delta t_\omega^{max}$ | 0.5 sec | |
| | $\theta^{Thr}$ | 180 deg | |
| | $\Delta t_\theta^{max}$ | 0.5 sec | |
| | $A_y^{Thr\_4}$ | 0.8 * max range of accelerometer measurement (e.g. $A_y^{Thr\_4} = 15$ g) | |
| | $\Delta t_A^{max}$ | 3 sec | |
| Sensor Recalibration Criteria (324) | p | 3 | Energy |
| Safing Criteria (200) | $A_Y^{Thr\_3}$ | 1.9 g | Measures & Energy |
| | $\omega^{Thr\_3}$ | 50 deg/sec | |

Fig. 10

| Test | A | B | C | D |
|---|---|---|---|---|
| Type | Corkscrew | | Deceleration Sled | |
| Initial Speed MPH | 33 | -28 | 14 | 17 |
| Avg. Deceleration g | | | 1.5 | 2.5 |
| Result | Roll | Non-Roll | Non-Roll | Roll |
| Energy Algorithm TTF (ms) | 537 | - | - | 594 |
| Measures Algorithm TTF (ms) | 855 | - | - | 98 |
| Safing Algorithm TTF (ms) | 846 | - | 43 | 26 |
| Head Closure (ms) | 905 | 800 | 216 | 196 |
| Maximum Roll Angle (deg) | - | 37 | 34 | - |

VEHICLE ROLLOVER DETECTION SYSTEM

The instant application claims the benefit of U.S. Provisional Application Serial No. 60/272,611 filed on Mar. 1, 2001, which is incorporated herein by reference.

In the accompanying drawings:

FIGS. 8a, 8b and 8c are tables that illustrate details of the rollover detection algorithm;

FIGS. 9a and 9b are tables that illustrate examples of values of parameters of the rollover detection algorithm;

FIG. 10 illustrates a table of conditions associated with various rollover events and non-rollover events;

There exists a need for a vehicle rollover detection system that provides for discrimination of vehicle rollover sufficiently quickly to enable associated safety restraint actuators, e.g. seat belt pretensioners, air bags or roll curtains, to be deployed before an initial head contact with the interior of the vehicle, particularly for the types of rollovers resulting in relatively fast head closure times. For example, there are some roll events for which head closure may occur before it can be reliably determined from the physics of the roll event whether the vehicle will completely rollover. There further exists a need for a robust vehicle rollover detection system that provides for sufficiently fast discrimination of vehicle rollover responsive to either relatively slow or relatively fast rollover events.

Figure 1A:
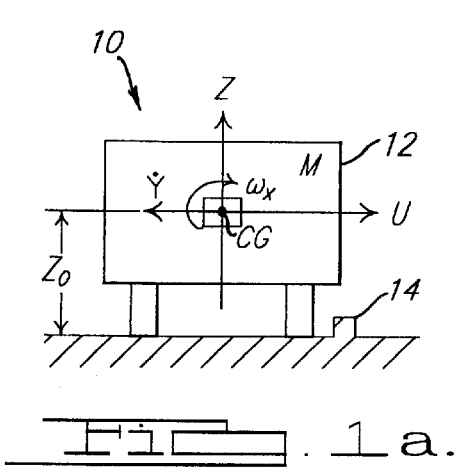
FIG. 1a illustrates a rear view of a vehicle prior to the initiation of a roll event.

Referring to FIG. 1a, a rollover detection system 10 is seen mounted in a vehicle 12. The vehicle 12 is shown with a local Cartesian coordinate system with the X-axis aligned with the vehicle's longitudinal axis—positive forward,—the Y-axis aligned with the vehicle's lateral axis—positive leftward,—and the Z-axis aligned with the vehicle's vertical axis—positive upward. The vehicle 12 has a mass M, and the associated center-of-gravity CG thereof is located at a height $Z_0$ above the ground The vehicle 12 is shown sliding at a velocity U in the negative Y direction towards an obstruction 14.

Figure 1B:
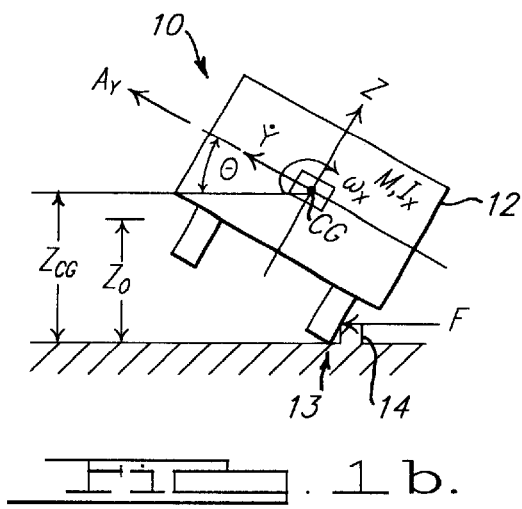
FIG. 1b illustrates a rear view of a vehicle during a roll event.

Referring to FIG. 1b, upon one or more wheels 16 of the vehicle 12 engaging the obstruction 14, the resulting reaction force F therefrom causes the vehicle 12 to rotate about the X-axis relative to a trip point 13, at a time dependent angular velocity $\omega_x(t)$ causing a time dependent angular position $\theta(t)$, wherein the vehicle 12 has a moment-of-inertia $I_x$ about the associated axis of rotation that is parallel with the X-axis and intersecting the trip point 13. The rotation of the vehicle 12 increases the height $Z_{CG}$ of the center-of-gravity CG relative to the height $Z_0$ thereof prior to engagement with the obstruction 14, thereby increasing the potential energy $M \cdot g \cdot (Z_{CG} - Z_0)$ of the vehicle 12 relative to the pre-engagement position and orientation. Accordingly, the potential energy of the vehicle 12 is dependent upon the angular position θ thereof. Furthermore, with rotation, the vehicle 12 gains an angular kinetic energy of $$I_x \cdot \frac{\omega_x^2}{2}.$$

The reaction force F also causes a linear acceleration $$A = \frac{F}{M}$$

of the center-of-gravity CG, as indicated by the lateral acceleration component $A_y(t)$ along the local Y-axis. Whereas FIGS. 1a and 1b illustrate a roll event caused by the impact of a sliding vehicle with an obstruction, it should be understood that roll events can be caused by other scenarios, e.g. a tire blowout followed by a subsequent engagement of the associated wheel rim with the ground. Accordingly, the rollover detection system 10 is not limited to a particular type of roll event.

Figure 2:
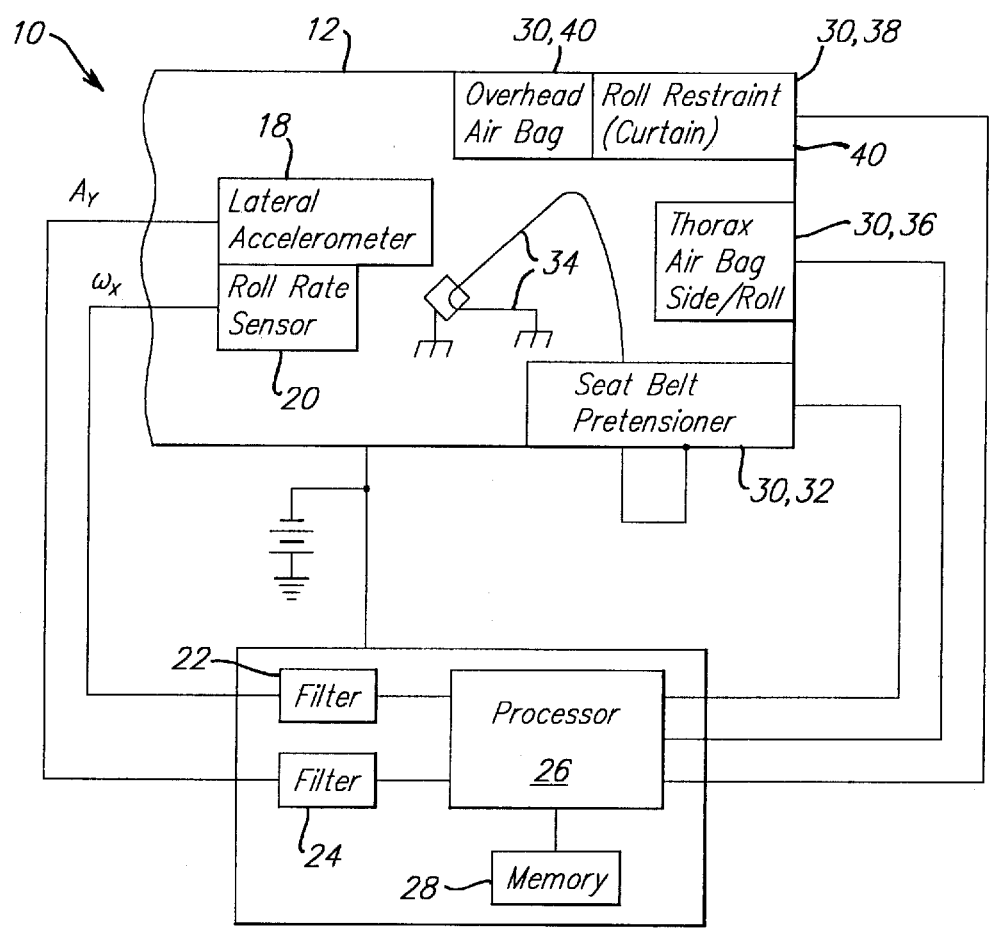
FIG. 2 illustrates a block diagram of a rollover detection system.

Referring to FIG. 2, the rollover detection system 10 comprises a lateral accelerometer 18 and an angular rate sensor 20, which are preferably, but not necessarily, mounted proximate to the center-of-gravity CG of the vehicle 12. The lateral accelerometer 18 is responsive to a time dependent lateral acceleration component $A_y(t)$ of acceleration along the local Y-axis. For example, the lateral accelerometer 18 may comprise an accelerometer, e.g. a micro-machined accelerometer having at least one axis of sensitivity, with an axis of sensitivity substantially aligned with the local Y-axis. The angular rate sensor 20, e.g. a gyroscope, is oriented so as to be responsive to a time-dependent component of angular velocity $\omega_x(t)$ about the local X-axis. The lateral accelerometer 18 and angular rate sensor 20 are operatively coupled to respective filters 22, 24 that filter the respective signals $A_y(t)$ and $\omega_x(t)$ for processing by a processor 26 having a memory 28. It should be understood that the filters 22, 24 can be either separate from or incorporated in the processor 26, and may be either analog or digital, or a combination thereof, as known to one of ordinary skill in the art. Moreover, the filters 22, 24 could be adapted as part of the respective lateral accelerometer 18 or angular rate sensor 20. The processor 26 processes the respective filtered $\tilde{A}_y(t)$ and $\omega_x(t)$ signals so as to discriminate whether or not the vehicle would be likely to roll over, and responsive thereto, to control the actuation of appropriate safety restraint actuators 30 so as to mitigate rollover induced injury to an occupant of the vehicle 12. For example, the processor 26 may comprise a digital computer, microprocessor or other programmable device, an analog processor, analog or a digital circuitry, or a combination thereof. Moreover, the safety restraint actuators 30 may include, but are not limited to, a seat belt pretensioner 32 operatively connected to a seat belt 34; a thorax air bag inflator 36 adapted to provide protection from both rollover and side-impact crashes; a roll curtain 38 adapted to deploy between the occupant and the side window 39 of the vehicle 12; or an overhead air bag inflator 40 adapted to deploy an air bag from the roof or headliner of the vehicle 12. Whereas FIG. 2 illustrates the safety restraint actuators 30 for one seating position of the vehicle 12, it should be understood that safety restraint actuators 30 may be provided at each seating position, and that the rollover detection system 10 can be adapted to control any or all of the safety restraint actuators 30 responsive to rollovers in any direction for which the associated safety restraint actuators 30 are adapted to mitigate occupant injury. Moreover, the particular set of safety restraint actuators 30 need not necessarily include all of those described hereinabove, or may include other types of safety restraint actuators 30 not described hereinabove.

Figure 3:
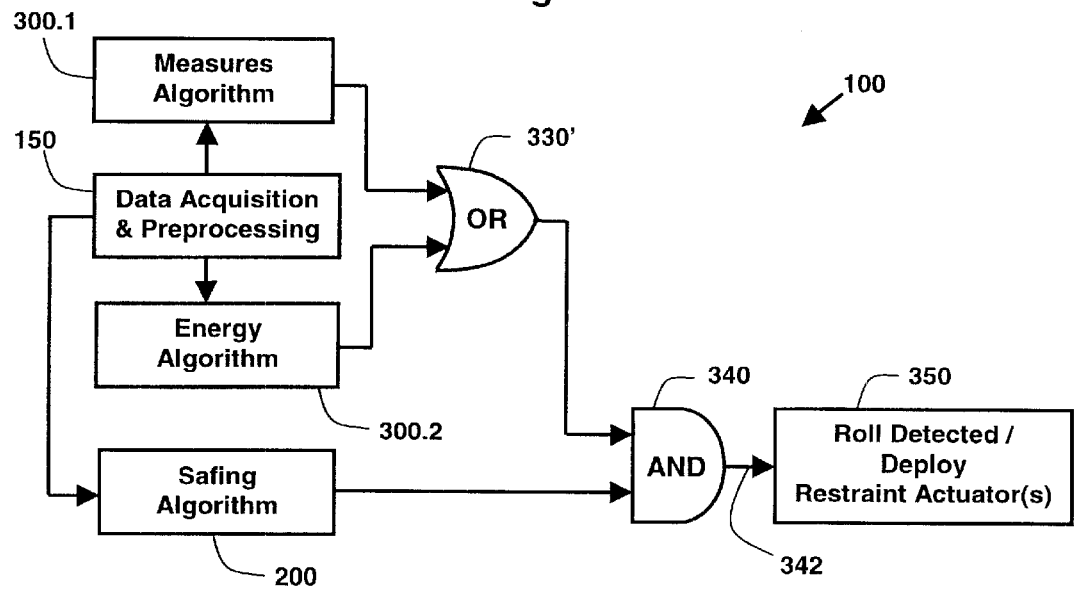
FIG. 3 illustrates a flow diagram of a rollover detection algorithm.

Referring to FIG. 3, in accordance with one embodiment of a rollover detection algorithm 100 for detecting a vehicle rollover and controlling the actuation of one or more associated safety restraint actuators 30—e.g. in accordance with the apparatus illustrated in FIG. 2—comprises the combination of a data acquisition and preprocessing algorithm 150, a measures algorithm 300.1, an energy algorithm 300.2, a safing algorithm 200 and associated logic 330', 340 that generates a signal 342 that controls the actuation of the safety restraint actuator(s) 30 responsive thereto.

The measures algorithm 300.1 uses a heuristic, time-domain discrimination process to detect a rollover condition, and can be beneficial in shortening deployment times for most rollover events characterized by relatively fast head closure times (e.g. <250 msec) that are typically associated with larger lateral vehicle forces. The measures algorithm 300.1 utilizes both the filtered lateral acceleration component $\tilde{A}_y$ and filtered angular velocity $\omega_x$ signals to evaluate a function that is compared with a threshold, that along with other criteria, are used to make a deployment decision.

The energy algorithm 300.2 uses a phase-space discrimination process—based upon the physics associated with a vehicle rollover process—to detect a rollover condition, and can be beneficial in providing reliable deployment decisions for slower roll events that are caused primarily by vertical forces on the vehicle or by low level lateral forces on the vehicle 12. The energy algorithm 300.2 utilizes the filtered angular velocity $\omega_x$ signal to determine the roll state of the vehicle 12 and to compare the instantaneous total energy (rotational kinetic and potential) thereof with that needed to cause the vehicle 12 to roll past an associated equilibrium position. The energy algorithm 300.2 utilizes both the filtered lateral acceleration component $\tilde{A}_y$ and filtered angular velocity $\omega_x$ signals in the associated entrance and exit criteria.

Whereas FIG. 3 illustrates the measures algorithm 300.1 and the energy algorithm 300.2 used in combination, it should be understood that this is not essential, and that either of the algorithms can be used alone. However, the combination of algorithms increases the robustness of the associated rollover detection system 10, because for some conditions, e.g. "curb-trip" conditions, the measures algorithm 300.1 can provide faster discrimination than the energy algorithm 300.2; whereas for other conditions, e.g. "corkscrew", "ramp" or "flip" conditions, the energy algorithm 300.2 can provide faster discrimination than the measures algorithm 300.1.

The measures algorithm 300.1 and energy algorithm 300.2 are independent of one another, although each utilizes common, filtered data from the data acquisition and preprocessing algorithm 150, i.e. a filtered lateral acceleration component $\tilde{A}_y$ and a filtered angular velocity $\omega_x$. Both the measures algorithm 300.1 and the energy algorithm 300.2 are characterized by associated entrance and exit criteria, wherein calculations associated with the respective algorithm are commenced if the respective associated entrance criteria is satisfied, and these calculations are terminated if the respective associated exit criteria is satisfied, and then reset if and when the entrance criteria are subsequently satisfied.

The safing algorithm 200 can improve the reliability of the rollover detection system 10 by providing an independent set of conditions, or safing criteria—dependent upon the filtered lateral acceleration component $\tilde{A}_y$ and/or filtered angular velocity $\omega_x$—that must be met in order to enable the deployment of the one or more associated safety restraint actuators 30. Both the measures algorithm 300.1 and the energy algorithm 300.2 are each "safed" by a common safing algorithm 200. Whereas the sating algorithm 200 provides for additional discrimination so as to mitigate against an undesirable actuation of the safety restraint actuators 30 responsive to non-rollover events, it should be understood that the safing algorithm 200 is not essential, and that either measures algorithm 300.1 or the energy algorithm 300.2 can be used alone, or in combination with one another, with or without the safing algorithm 200.

In the operation of the rollover detection algorithm 100, responsive to data from the data acquisition and preprocessing algorithm 150, if either the measures algorithm 300.1 OR 330' the energy algorithm 300.2 detects a vehicle rollover condition, AND 340 if the sating algorithm 200 determines that an associated independent safing condition is satisfied, then, in step (350), one or more safety restraint actuators 30 are deployed so as to mitigate injury to an associated occupant of the vehicle, that could result from the rollover event, whether or not the vehicle 12 actually rolls over.

The data acquisition and preprocessing algorithm 150, safing algorithm 200, measures algorithm 300.1, and energy algorithm 300.2 are described hereinbelow with reference to flow charts illustrated in FIGS. 3–7. FIG. 6 illustrates a flow chart of a general algorithmic structure of both the measures algorithm 300.1 and the energy algorithm 300.2, wherein particular details of the measures algorithm 300.1 and the energy algorithm 300.2 are provided in table format in FIGS. 8a–c. The algorithms are described mathematically, wherein parameters are used for application specific constants, and these parameters are listed in FIGS. 9a and 9b along with exemplary values for a particular type of vehicle. It should be understood that the parameters are generally adapted to a particular application, e.g. vehicle platform, and that the particular values of the parameters in FIGS. 9a and 9b are illustrative only, and should not be considered to limit the scope of the instant invention.

Figure 4:
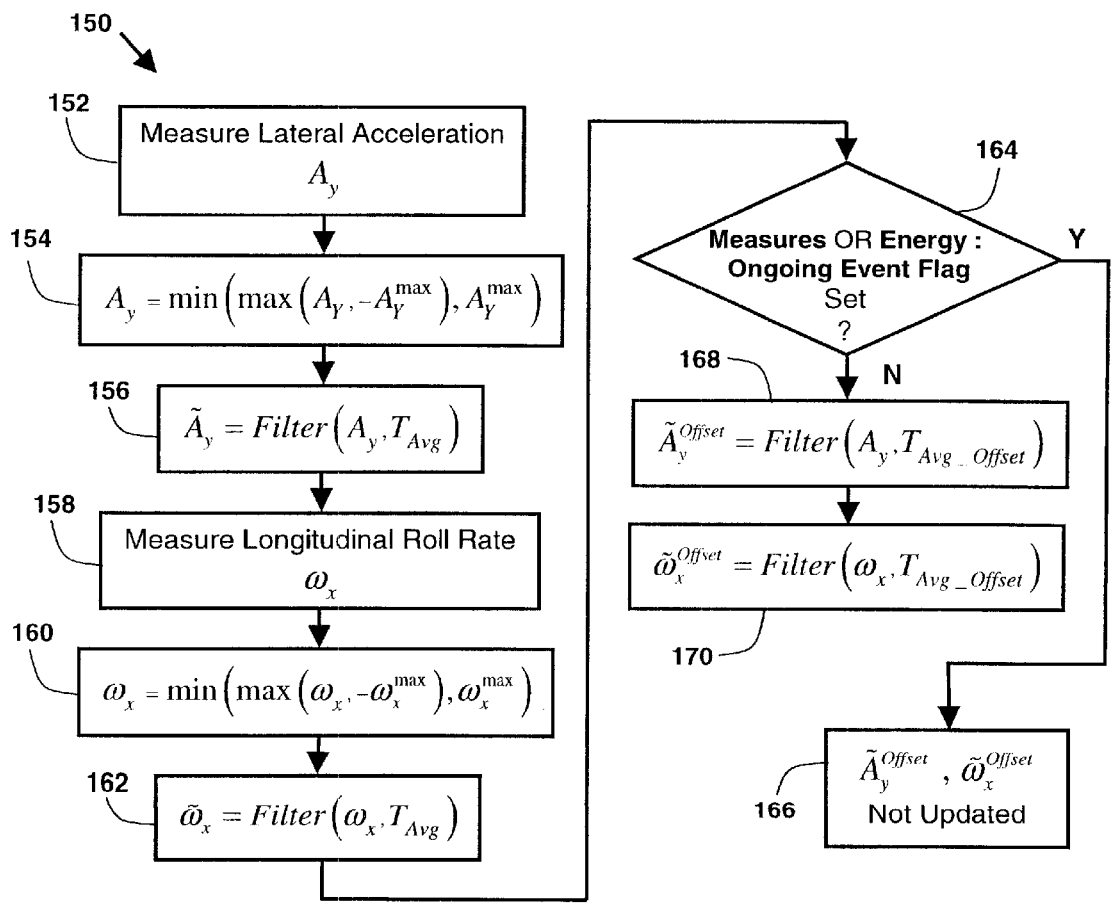
FIG. 4 illustrates a flow diagram of a data acquisition and preprocessing algorithm incorporated in the rollover detection algorithm.

Referring to FIG. 4, the data acquisition and preprocessing algorithm 150 acquires a measurement of lateral acceleration component $A_y$ from the lateral accelerometer 18 in step (152), and acquires a measurement of longitudinal angular velocity $\omega_x$, or roll rate, from the angular rate sensor 20 in step (158). Data from more than 100 rollover tests has indicated that the angular velocity $\omega_x$ associated with a rollover generally ranges between ±300 degrees/second ($\pm|\omega_x^{max}|$) and the lateral acceleration component $A_y(t)$ associated therewith generally ranges between ±20 g ($\pm|A_y^{max}|$). Respective measurements of the lateral acceleration component $A_y(t)$ and the angular velocity $\omega_x$ that exceed these respective limits are respectively clipped thereat in steps (154) and (160) respectively. For example, the value of an lateral acceleration component $A_y(t)$ measurement less that −20 g would be set in step (154) to −20 g, for the example of an associated range of ±20 g. The polarities of the lateral accelerometer 18 and the angular rate sensor 20 are set so that the corresponding polarities of angular velocity $\omega_x$ and the lateral acceleration component $A_y$ signals are the same as each other during a roll event. Generally, the level $|A_y^{max}|$ for clipping signals from the lateral accelerometer 18 is set to the minimum of either 20 g or the range of the lateral accelerometer 18. Similarly, the level $|\omega_x^{max}|$ for clipping signals from the angular rate sensor 20 is set to the minimum of either 300 degrees/second or the range of the angular rate sensor 20.

The raw lateral acceleration component $A_y$ and angular velocity $\omega_x$ data from the lateral accelerometer 18 and the angular rate sensor 20 respectively is filtered by respective filters 22, 24 in steps (156) and (162) respectively, so as to respectively provide a filtered lateral acceleration component $\tilde{A}_y$ and a filtered angular velocity $\omega_x$. The use of filtered measurements is beneficial in avoiding a false entrance of the roll discrimination algorithm, and in improving the associated discrimination process by the measures algorithm 300.1 and the energy algorithm 300.2. The filters 22, 24 are, for example, moving average filters having a moving average window of $T_{Avg}$, e.g. between 10 and 15 milliseconds, so as to provide a suitable compromise between fast signal response and noise reduction. As an example, for a processor 26 that uniformly samples the angular velocity $\omega_x$ and lateral acceleration component $A_y$ signals—as is assumed hereinbelow—with a sampling rate of 2500 Hz (corresponding to a sample period dt=0.4 milliseconds) and a window of 12.8 milliseconds, a moving average for each signal would be calculated from the last 32 samples acquired. The individual samples of the moving average are typically uniformly weighted, but could alternately be non-uniformly weighted.

Generally, the lateral accelerometer 18 and the angular rate sensor 20 can exhibit offset and/or drift error (generally referred to herein as sensor offset error), which, unless otherwise compensated, can cause associated roll detection errors. The sensor offset errors are estimated by filtering the associated sensor measurements with associated filters having an effective cutoff frequency that is substantially lower—or, stated in another way, a effective filter time constant that is substantially greater—than the associated above-described moving-average filters that provide the filtered lateral acceleration component $\tilde{A}_y$ and the filtered angular velocity $\omega_x$. For example, the acceleration offset $\tilde{A}_y^{Offset}$ and the angular velocity offset $\omega_x^{Offset}$ are filtered from the associated raw measurements of angular velocity $\omega_x$ and lateral acceleration component $A_y$, respectively, by respective moving average filters in steps (168) and (170) respectively, each moving-average filter having an associated filter window of width $T_{Avg\_Offset}$, e.g. about 4 seconds. From step (164), the filtered values of acceleration offset $\tilde{A}_y^{Offset}$ and angular velocity offset $\omega_x^{Offset}$ are updated only if the neither the measures algorithm 300.1 nor the energy algorithm 300.2 have been entered, as indicated by neither associated ONGOING_EVENT_FLAGs—i.e. neither an ONGOING_MEASURES_EVENT_FLAG nor an ONGOING_ENERGY_EVENT_FLAG—being set. Accordingly, in step (166), the relatively long-term filtered values of acceleration offset $\tilde{A}_y^{Offset}$ and angular velocity offset $\omega_x^{Offset}$ are not updated during periods of time when the associated lateral acceleration component $A_y$ and angular velocity $\omega_x$ could be substantially different from the associated sensor offset values.

Whereas FIG. 4 illustrates the acquisition and processing of the lateral acceleration component $A_y$ before that of the angular velocity $\omega_x$, it should be understood that the relative order could be reversed, or these operations could be performed in parallel.

The measures algorithm 300.1, energy algorithm 300.2, and the safing algorithm 200 each utilize values of filtered lateral acceleration component $\tilde{A}_y$ and filtered angular velocity $\omega_x$ that are compensated by subtracting the corresponding sensor offsets, i.e. the acceleration offset $\tilde{A}_y^{Offset}$ and the angular velocity offset $\omega_x^{Offset}$ respectively, so as to provide a corresponding compensated lateral acceleration component $(A_y'(t)=\tilde{A}_y(t)-\tilde{A}_y^{Offset}(t))$ and a compensated angular velocity $(\omega_x'(t)=\omega_x(t)-\omega_x^{Offset}(t))$ respectively.

Figure 5:
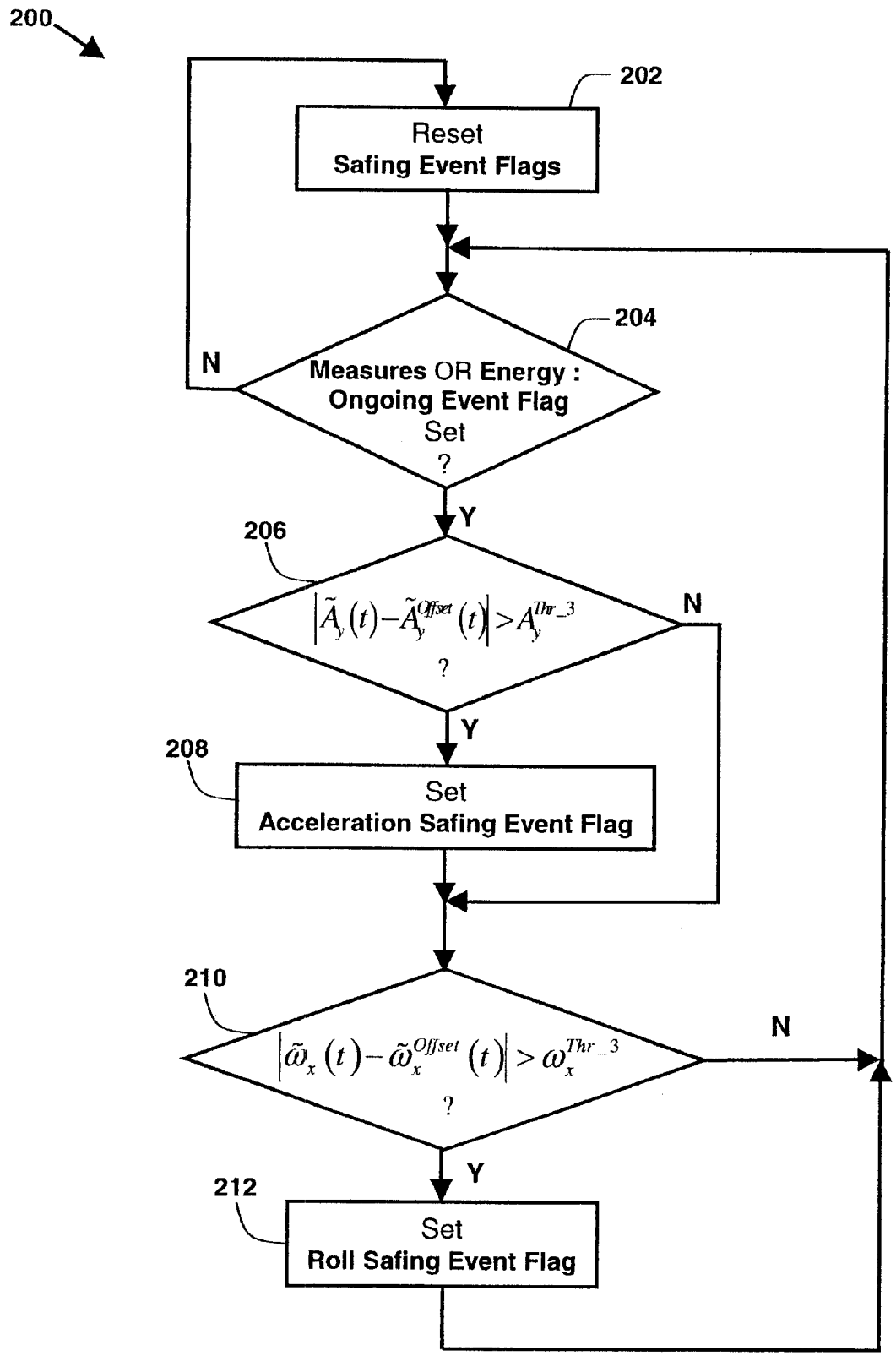
FIG. 5 illustrates a flow diagram of a safing algorithm incorporated in the rollover detection algorithm.
Figure 6:
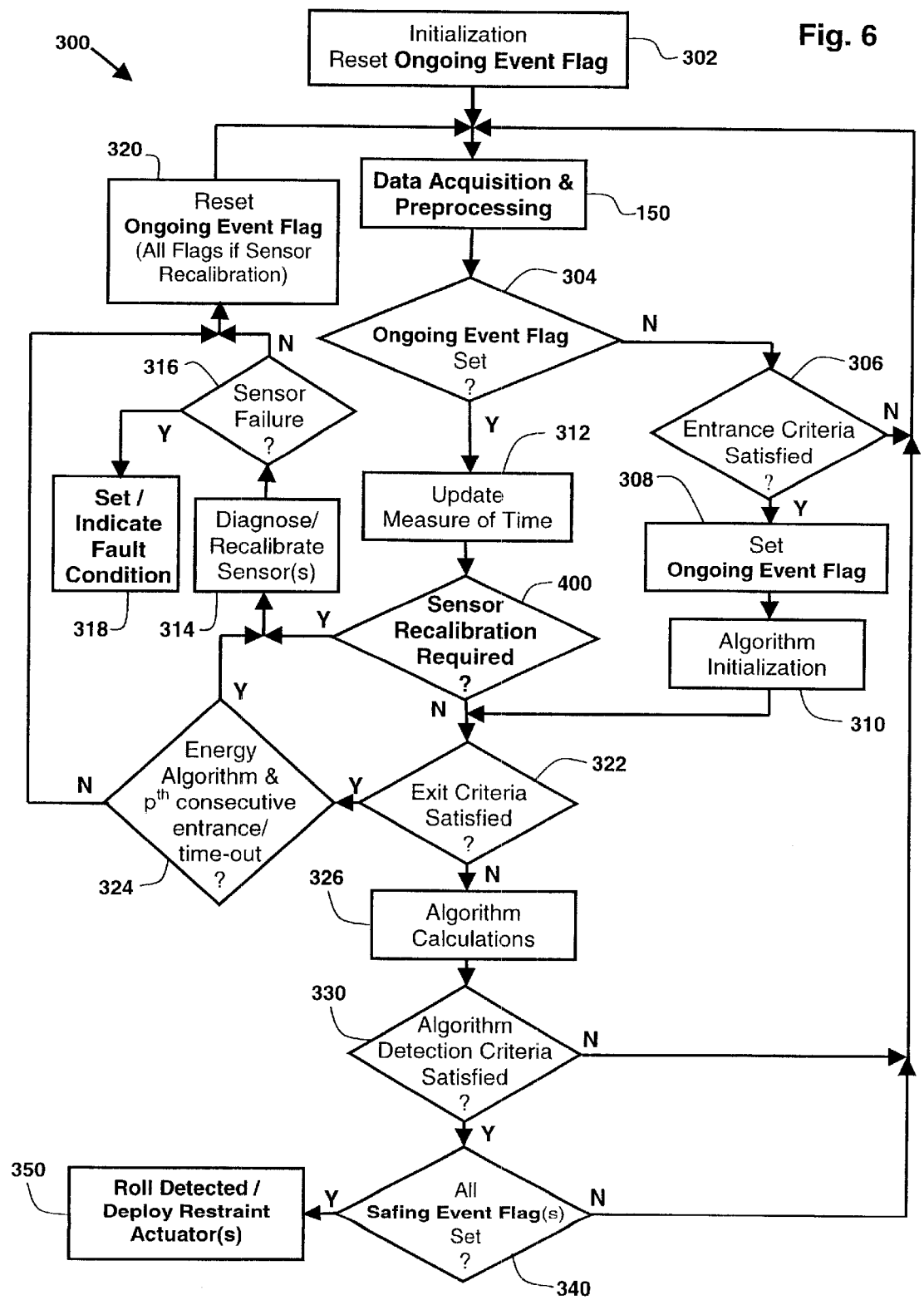
FIG. 6 illustrates a flow diagram of the rollover detection algorithm.

Referring to FIG. 5, the safing algorithm 200 commences with step (202), wherein associated SAFING_EVENT_FLAGs—i.e. an ACCELERATION_SAFING_EVENT_FLAG and a ROLL_SAFING_EVENT_FLAG—are initially reset. Then, in step (204), if the either the measures algorithm 300.1 or the energy algorithm 300.2 have been entered, as indicated by either of the associated ONGOING_EVENT_FLAGs (i.e. the ONGOING_MEASURES_EVENT_FLAG or the ONGOING_ENERGY_EVENTFLAG) being set, then in step (206), if the magnitude of the compensated lateral acceleration component $A_y'$ is greater than a third acceleration threshold $A_y^{Thr\_3}$, then the ACCELERATION_SAFING_EVENT_FLAG is set in step (208). Otherwise, from step (204), the process repeats with step (202). Following step (208), or otherwise from step (206), in step (210), if the magnitude of the compensated angular velocity $\omega_x'$ is greater than a third angular velocity threshold $\omega_x^{Thr\_3}$, then the ROLL_SAFING_EVENT_FLAG is set in step (212). Then, or otherwise from step (210), the process repeats with step (204). Accordingly, if the conditions on lateral acceleration and angular velocity associated with the safing algorithm 200 have been satisfied—not necessarily simultaneously—after at least one of the measures algorithm 300.1 and the energy algorithm 300.2 have commenced and before both have exited, then the respective associated SAFING_EVENT_FLAGs are set so as to enable a deployment of the one or more associated safety restraint actuators 30 responsive to the detection of a roll event by either the measures algorithm 300.1 or the energy algorithm 300.2. Each of the SAFING_EVENT_FLAGs are set, or latched, separately, but both are reset simultaneously, and both must be set in order for the one or more associated safety restraint actuators 30 to be actuated responsive to the measures algorithm 300.1 or the energy algorithm 300.2.

Alternately, the safing algorithm 200 may be adapted to incorporate only one of the above-described SAFING_EVENT_FLAGs and associated criteria, so that the safing criteria is responsive to at least one of a magnitude of the compensated lateral acceleration component $A_y'$ being greater than a third acceleration threshold $A_y^{Thr\_3}$ at a first point of time following a time of inception of either the measures algorithm 300.1 or the energy algorithm 300.2, and a magnitude of the compensated angular velocity $\omega_x$ being greater than a third angular velocity threshold $\omega_x^{Thr\_3}$ at a second point of time following the time of inception, wherein the time of inception is the time at which the associated entrance criteria are satisfied for the associated measures algorithm 300.1 or energy algorithm 300.2, and the first and second points of time following the time of inception are arbitrary with respect to one another. For example, the energy algorithm 300.2 could be "safed" responsive solely to the compensated lateral acceleration component $A_y'$ being greater than a third acceleration threshold $A_y^{Thr\_3}$ at a point of time following a time of inception of the energy algorithm 300.2.

The rollover detection system 10 may be adapted for improved reliability by implementing the sating algorithm 200 on a microprocessor that is separate from that used to implement either the measures algorithm 300.1 or the energy algorithm 300.2, in which case if the safing algorithm 200 is not aware of the ONGOING_EVENT_FLAGs, then instead of being reset responsive to these flags, the SAFING_EVENT_FLAGs may be reset after a delay, e.g. $\Delta t_{max}^E$ (e.g. 12 seconds), following a point in time at which either safing criteria was last satisfied so that the safing condition remains active until either a deployment of the one or more associated safety restraint actuators 30, or until after both algorithms will have had to have exited.

The measures algorithm 300.1 and the energy algorithm 300.2 each operate in accordance with the general algorithmic structure illustrated in FIG. 6, wherein each of these algorithms is indicated generally by reference number 300. A decimal designator to a particular reference number will be used herein to refer to a particular algorithm. For example, whereas the general overall process is referred to by reference number 300, reference number 300.1 is used to refer to the measures algorithm, and reference number 300.2 is used to refer to the energy algorithm. As an other example, whereas the general algorithm calculations step is referred to by reference number 326, reference number 326.1 is used to refer to the algorithm calculations step of the measures algorithm 300.1 in particular, and reference number 326.2 is used to refer to the algorithm calculations step of the energy algorithm 300.2. The particular equations associated with particular algorithmic steps, for each of the algorithms, are provided in tabular form in FIGS. 8a–c; and the associated parameters and exemplary values thereof are provided in tabular form in FIGS. 9a–b.

Referring to FIG. 6, the general roll processing algorithm commences with step (302), wherein a corresponding ONGOING_EVENT_FLAG is reset. The ONGOING_EVENT_FLAG, when set, indicates that the entrance criteria has been satisfied for the roll processing algorithm, and the corresponding exit criteria has not been satisfied, so that the associated algorithm is active. Then in step (150), the associated data that is used by the algorithm is acquired and preprocessed in accordance with the data acquisition and preprocessing algorithm 150 described hereinabove. Then, in step (304), if the ONGOING_EVENT_FLAG has not been set—indicating that data from a potential roll event is not being processed, and that the vehicle 12 is not then involved in a roll event—then, in step (306), a set of entrance criteria are evaluated and compared with associated thresholds, and if the entrance criteria are satisfied, then in step (308) the ONGOING_EVENT_FLAG is set, and in step (310), the algorithm is initialized, e.g. by initializing various dynamic variables associated with the algorithm.

Figure 7:
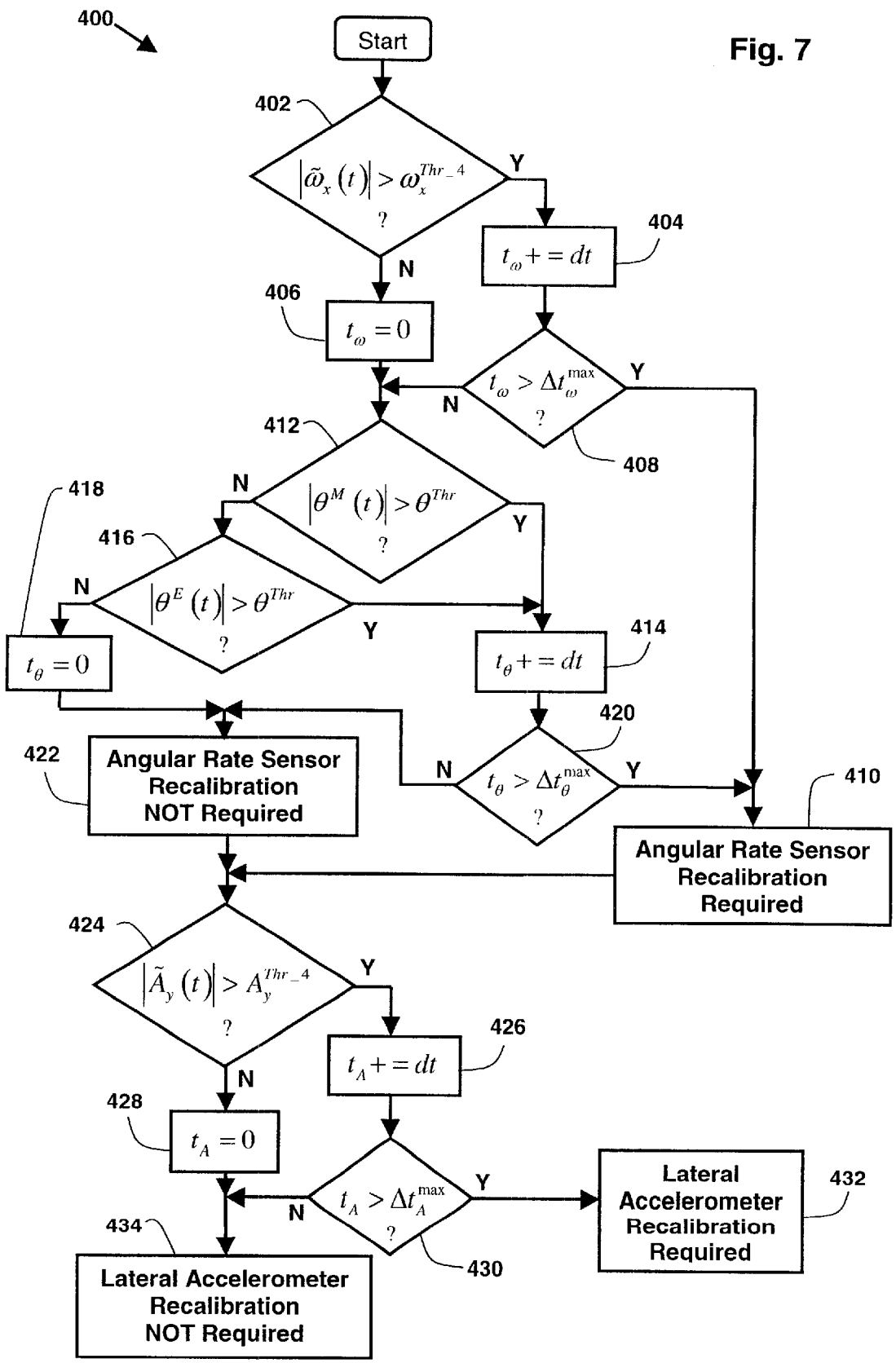
FIG. 7 illustrates a flow diagram of an algorithm incorporated in the rollover detection algorithm for determining if sensor recalibration is required.
Figure 11B:
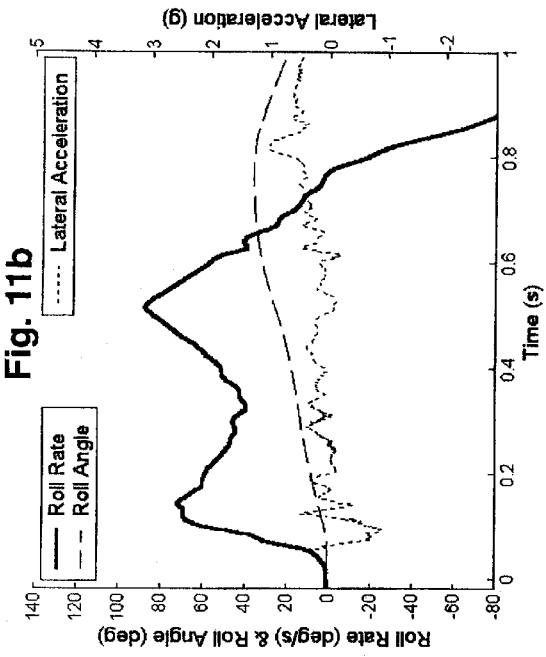
FIG. 11b illustrates a plot of filtered roll rate, roll angle and filtered lateral acceleration of a vehicle subjected to a corkscrew roll test designated as Test B, resulting in a non-rollover event.
Figure 11D:
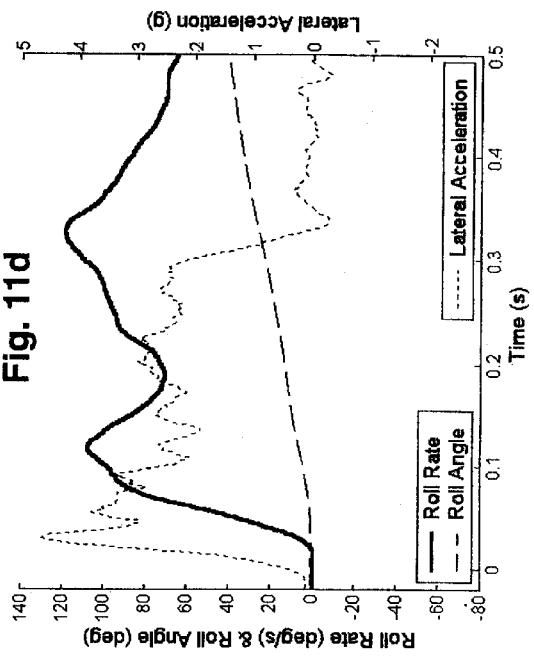
FIG. 11d illustrates a plot of filtered roll rate, roll angle and filtered lateral acceleration of a vehicle subjected to a deceleration sled test designated as Test D, resulting in a rollover event.
Figure 11A:
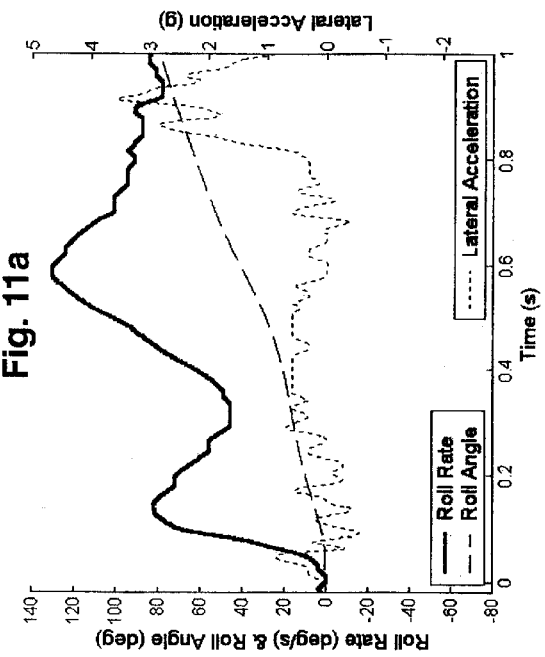
FIG. 11a illustrates a plot of filtered roll rate, roll angle and filtered lateral acceleration of a vehicle subjected to a corkscrew roll test designated as Test A, resulting in a rollover event.
Figure 11C:
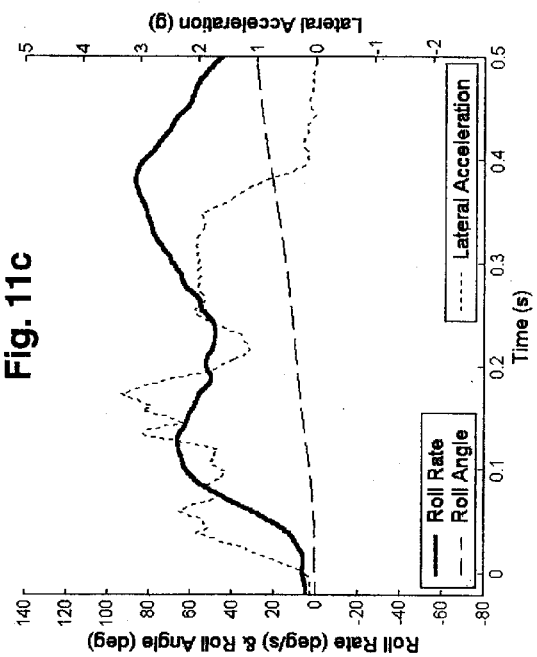
FIG. 11c illustrates a plot of filtered roll rate, roll angle and filtered lateral acceleration of a vehicle subjected to a deceleration sled test designated as Test C, resulting in a non-rollover event.

Otherwise, from step (304), if the ONGOING_EVENT_FLAG has been set—indicating that data from a potential roll event is being processed,—then in step (312) an associated measure of time, e.g. sample count, is updated, and in step (400), the newly acquired data is evaluated so as to determine if a sensor (i.e. the lateral accelerometer 18 or the angular rate sensor 20) needs to be recalibrated. The process associated with step (400) is illustrated in FIG. 7 and is described more fully hereinbelow.

If, from step (400), one or more sensors require recalibration, then in step (314), the one or more sensors requiring recalibation are recalibrated. For example, both the lateral accelerometer 18 and the angular rate sensor 20 may be testable, wherein a known stimulus may be applied to the sensor, and the corresponding sensor output may be calibrated so as to represent the known stimulus. For example, the lateral accelerometer 18 may comprise a micro-machined mass element suspended by spring-element beams, and an electrostatic field may be applied between the mass element and a housing so as to deflect the beam by an amount that corresponds to a reference acceleration level. A calibration factor is then calculated so that the calibrated output from strain sensing elements operatively connected to the spring-element beams corresponds to the reference acceleration level. If, in step (316), the process of step (314) indicates that one or more sensors have failed—for example, if there is substantially no change in output responsive to whether or not the test stimulus in applied to the sensor, then in step (318) a fault condition is set; a warning device, e.g. light, is activated so as to alert the driver of the vehicle 12; and the rollover detection system 10 is disabled from deploying any safety restraint actuators 30. Otherwise, from step (316), i.e. if neither the lateral accelerometer 18 nor the angular rate sensor 20 has failed, then, in step (320), both ONGOING_EVENT_FLAGs—i.e. the ONGOING_MEASURES_EVENT_FLAG and the ONGOING_ENERGY_EVENT_FLAG—are reset responsive to there having been at least one sensor recalibration, and the process repeats anew with step (150).

Otherwise, from step (400), if none of the sensors require recalibration, then, in step (322), an exit criteria is evaluated so as to determine whether the algorithm should be exited until such time that the entrance criteria of step (306) are again satisfied so as to enable the algorithm to be reentered. If, from step (322), the exit criteria are satisfied, then, in step (324), if the algorithm is the energy algorithm 300.2, and if the energy algorithm 300.2 has consecutively been entered in step (306), and then exited in step (322) as a result of a time-out (i.e. $\Delta t > \Delta t_{max}^E$), then reentered in step (306) shortly—e.g. during the next iteration of the algorithm—after exiting in step (322), then after the $p^{th}$ consecutive exit in step (322)—e.g. p=3—the process continues with step (314) as described hereinabove, wherein the sensors are diagnosed, and if necessary, recalibrated. Otherwise, from step (324), the associated ONGOING_EVENT_FLAG—i.e. the ONGOING_MEASURES_EVENT_FLAG or the ONGOING_ENERGY_EVENT_FLAG—is reset in step (320), and the process repeats anew with step (150).

Otherwise, from step (322), if the algorithm has been entered in step (306) and not exited in step (322), then the associated algorithm calculations are performed for the particular iteration of the algorithm associated with a particular value of the measure of time from either steps (310) or (312). Then, in step (330), if the associated algorithm detection criteria are satisfied in the particular iteration of the algorithm, and if, in step (340), the SAFING_EVENT_FLAG(s)—i.e. the ACCELERATION_SAFING_EVENT_FLAG and the ROLL_SAFING_EVENT_FLAG—have been set, then in step (350) a roll event has been detected, and the associated safety restraint actuators 30 are actuated. Otherwise either, from step (330), if the algorithm detection criteria are not satisfied, or, from step (340), if all of the SAFING_EVENT_FLAG(s) have not been set—so that the associated safing criteria has not been satisfied at some point in time during either the measures algorithm 300.1 or the energy algorithm 300.2, then the process continues repeats beginning with step (150) for the next iteration.

Although both the measures algorithm 300.1 and the energy algorithm 300.2 depend upon measurements of the lateral acceleration component $A_y$ and the longitudinal angular velocity $\omega_x$ from the data acquisition and preprocessing algorithm 150, the other variables and parameters associated with each algorithm are otherwise independent of one another, as are the associated entrance criteria in step (306), algorithm initializations in step (310), exit criteria in step (322), algorithm calculations in step (326), and algorithm decision criteria in step (330), examples of all of which are detailed in FIGS. 8a, 8b, 8c, 9a and 9b. For example, whereas each algorithm determines a measure of time since inception, and calculates a measure of roll angle by integrating the measurement of longitudinal angular velocity $\omega_x$, these respective measures of time are independent of one another, as are the respective measures of roll angle. Both the measures algorithm 300.1 and the energy algorithm 300.2 assume that the vehicle is initially level (i.e. $\theta(t_{entrance})=0$) when the processing by the respective algorithms is commenced.

The process 400 for determining whether or not either the lateral accelerometer 18 or the angular rate sensor 20 requires recalibration is illustrated in FIG. 7. In steps (402), (404), (406) and (408), if the magnitude of the filtered angular velocity $\omega_x$ continuously exceeds a fourth angular rate threshold $\omega_x^{Thr-4}$ for an associated period of time $\Delta t_\omega^{max}$, then a recalibration of the angular rate sensor 20 is signaled in step (410). Otherwise, in steps (412), (414), (416), (418) and (420), if the either the magnitude of the roll angle $\theta^M$ from the measures algorithm 300.1, or roll angle $\theta^E$ from the energy algorithm 300.2, continuously exceeds a roll angle threshold $\theta^{Thr}$ for an associated period of time $\Delta t_\theta^{max}$, then a recalibration of the angular rate sensor 20 is signaled in step (410). Otherwise, in step (422), a recalibration of the angular rate sensor 20 is not signaled. In steps (424), (426), (428) and (430), if the magnitude of the filtered lateral acceleration component $\tilde{A}_y$ continuously exceeds a fourth lateral acceleration threshold $A_y^{Thr-4}$ for an associated period of time $\Delta t_A^{max}$, then a recalibration of the lateral accelerometer 18 is signaled in step (432). Otherwise, in step (434), a recalibration of the lateral accelerometer 18 is not signaled. If a recalibration was signaled in either steps (410) or (432), then the process continues with step (314) as described hereinabove. Otherwise, no sensor recalibration is signaled, and the process continues with step (322) as described hereinabove.

Referring to FIG. 6, FIGS. 8a–c, and FIGS. 9a–b, the measures algorithm 300.1 will now be discussed with greater particularity, wherein the steps of FIG. 6 are suffixed with ".1" to indicate their association therewith. The ONGOING_EVENT_FLAG for measures algorithm 300.1—referred to as the ONGOING_MEASURES_EVENT_FLAG—is set in step (308.1) upon satisfaction of the entrance criteria in step (306.1), and is reset in step (320.1) upon satisfaction of the exit criteria in step (322.1). The ONGOING_MEASURES_EVENT_FLAG, for example, could correspond to a particular location in the memory 28 of the associated processor 26 that implements the measures algorithm 300.1. After entry following step (306.1), the measures algorithm 300.1 is not subsequently exited until either the measures event exit criteria is satisfied in step (322.1), or until a roll event is detected causing a deployment of the safety restraint actuators 30. Moreover, after the measures event exit criteria is satisfied and the measures algorithm 300.1 is exited, the measures algorithm 300.1 can be subsequently reentered if the associated measures event entrance criteria is subsequently satisfied.

In step (306.1), the entrance criteria of the measures algorithm 300.1 is, for example, that the magnitude of the compensated lateral acceleration component $A_y'$ be greater than a first acceleration threshold $A_y^{Thr-1}$, i.e.:

$$|A_y'(t)| > A_y^{Thr-1}$$

For an example of one particular type of vehicle, based upon actual rollover data, the first acceleration threshold $A_y^{Thr-1}$ was set to about 1.4 g, It should be recognized that this threshold value, as well as the value of the other parameters of the measures algorithm 300.1, is generally dependent upon the characteristics of the particular associated vehicle 12 or class of vehicles, and that the particular value used for a particular rollover detection system 10 can be adjusted for improved discrimination dependent upon the nature of the associated vehicle 12 or class of vehicles.

In step (310.1), upon initial entrance to the measures algorithm 300.1 following step (308.1), the measures algorithm 300.1 is initialized. An event sample count $n^M$ and the values of angular position $\theta^M(n^M-1)$ and a measure function $R(n^M-1)$ are initialized—e.g. to values of zero. Also the sampled time $t^M(-1)$ just prior to the time of event entrance is initialized to a value of the time of measures event entrance $t^M(0)$, which is initialized to a value of the current time t; and the time period $\Delta t^M(0)$ since algorithm entrance is initialized to a value of zero. The superscript "M" used herein refers to variables associated with the measures algorithm 300.1.

Upon subsequent iteration of the measures algorithm 300.1, if in step (304.1) the ONGOING_MEASURES_EVENT_FLAG is set, then, in step (312.1), the event sample count $n^M$ is incremented, the associated current sampled time $t^M(n^M)$ is set equal to the current time t, and the measures event time $\Delta t^M$ is calculated as the period extending from the time of measures event entrance $t^M(0)$, to the current time $t^M(n^M)$ as follows:

$$\Delta t^M(n^M) = t^M(n^M) - t^M(0)$$

In step (322.1), the exit criteria of the measures algorithm 300.1 is, for example, that the time period since algorithm entrance $\Delta t^M(n^M)$ be greater than time period threshold $\Delta t_{max}^M$, i.e.:

$$\Delta t^M(n^M) > \Delta t_{max}^M$$

For the example of one particular type of vehicle, based upon actual rollover data, the time period threshold $\Delta t_{max}^M$ was set to about 165 milliseconds. Upon exit from the measures algorithm 300.1, the ONGOING_MEASURES_ EVENT_FLAG is reset in step (320.1), and pending subsequent satisfaction of the entrance criteria in step (306.1), this causes the variables associated with the measures algorithm 300.1 to be initialized in step (310.1).

If, in step (322.1), the exit criteria is not satisfied, then the algorithm calculations are updated in step (326.1) for the particular iteration of the measures algorithm 300.1, as follows.

First, the angular position $\theta^M$ is estimated by integrating the signed value of the compensated angular velocity $\omega_x'$ as follows:

$$\theta^M(n^M) = \theta^M(n^M-1) + \omega_x'(n^M) \cdot dt$$

wherein the integration time step $dt$ is given by the difference between the time $t^M(n^M)$ at the current iteration, and the time at the previous iteration $t^M(n^M-1)$ which difference would be constant for a uniform sampling rate—as follows:

$$dt = t^M(n^M) - t^M(n^M-1)$$

and the compensated angular velocity $\omega_x'$ is given by:

$$\omega_x'(t) = \omega_x(t) - \omega_x^{Offset}(t)$$

A measure function R is then evaluated, which is used to calculate a figure-of-merit FOM. The measure function R is given by:

$$R(n^M) = R(n^M-1) \cdot \left(1 - \frac{\Delta t^M}{\tau}\right) + F^* \cdot KE^* \cdot PE^*$$

The first term of the measure function R is a damping term comprising the product of the previous value, $R(n^M-1)$ multiplied by a damping factor $$\left(1 - \frac{\Delta t^M}{\tau}\right).$$

The level of damping is determined by a constant $\tau$ dependent upon the particular type of vehicle. For example, based upon rollover test data for a particular type of vehicle, the value of $\tau$ was determined to be about 400 seconds. The damping term ensures that the resulting figure-of-merit FOM will decrease for events for which the values of the compensated lateral acceleration component $A_y'$ or the compensated angular velocity $\omega_x'$ do not continue to be significant.

The remaining term of the measure function R, additive with the first term, is the product of the following three measures: a force measure $F^*$, a rotational kinetic energy measure $KE^*$, and a potential energy measure $PE^*$.

The force measure $F^*$ is given as the current sample of the compensated lateral acceleration component $A_y'$, which is given by:

$$A_y'(n^M) = \tilde{A}_y(t) - \tilde{A}_y^{Offset}(t)$$

Generally, force and acceleration are related by Newton's second law (F=M·A). The force measure $F^*$ is not necessarily an exact measure of force—which would generally need to account for the vector nature of force and acceleration—but instead is a measure that is at least related to the reaction force F acting upon the vehicle 12. During a typical vehicle roll event, the compensated lateral acceleration component $A_y'$, is caused by a lateral force on the tires or wheel rim. This lateral force is the same force responsible for the rotational torque about the center of vehicle mass that leads to eventual rollover. The compensated lateral acceleration component $A_y'$ does not necessarily provide a complete measure of the actual reaction force F. For example, the compensated lateral acceleration component $A_y'$ does not necessarily account for the effects of non-rigid body dynamics, e.g. from damping forces in the tire(s) or other damping elements, or from the dynamics of the suspension system. However, the compensated lateral acceleration component $A_y'$ is heuristically—for small angles and excluding the effects of non-rigid body dynamics—proportional to the reaction force F that causes the vehicle 12 to roll. Data from fast or tripped rollover tests has shown that the compensated lateral acceleration component $A_y'$ becomes significant about 20 milliseconds before significant compensated angular velocity $\omega_x'$ is observed from angular rate sensor 20. Whereas the force measure $F^*$ is illustrated herein as linear with respect to the compensated lateral acceleration component $A_y'$, it should be understood that the force measure $F^*$ could be some other function (other than linear) or power (other than 1) of the compensated lateral acceleration component $A_y'$.

The rotational kinetic energy measure $KE^*$ is given by $\omega_x'^2$. Generally, the rotational kinetic energy measure $KE^*$ is related to the rotational kinetic energy of the vehicle. For example, with $KE^* = \omega_x'^2$, the rotational kinetic energy measure $KE^*$ is proportional to the rotational kinetic energy of the vehicle 12 by the proportionality constant $I_x/2$. However, the rotational kinetic energy measure $KE^*$ could also be represented differently. For example, other powers of $\omega_x'$ other than 2 could be used to form the rotational kinetic energy measure $KE^*$ from compensated angular velocity $\omega_x'$, or the rotational kinetic energy measure $KE^*$ could be some other function of compensated angular velocity $\omega_x'$.

The product of the force measure $F^*$ and the rotational kinetic energy measure $KE^*$ provides for a measure that predicts rollover more quickly than compensated angular velocity $\omega_x'$ alone. This also provides a predictive measure of eventual compensated angular velocity $\omega_x'$, because it has been observed that significant lateral force inferred from the compensated lateral acceleration component $A_y'$ usually manifests as increased compensated angular velocity $\omega_x'$ about 20 milliseconds thereafter. Moreover, weighting the compensated angular velocity $\omega_x'$ more heavily than the compensated lateral acceleration component $A_y'$, e.g. by using the square of the compensated angular velocity $\omega_x'$, increases the influence of actual compensated angular velocity $\omega_x'$ upon the resulting figure-of-merit FOM.

The potential energy measure $PE^*$ is given as $PE^* = \text{sign}(A_y'(n^M)) \cdot \theta_0 + \theta^M(n^M)$ as a constant plus the current sample of the angular position $\theta^M(n^M)$. The constant $\theta_0$ is dependent upon the particular vehicle. For example, based upon rollover test data for a particular type of vehicle, the value of $\theta_0$ is about 0.1 degrees. The constant term has the same sign as either the compensated angular velocity $\omega_x'$ or the compensated lateral acceleration component $A_y'$, assuming both signals are polarized so as to have the same polarity for a given roll event. Including the potential energy measure $PE^*$ in the product term of the measure function R increases the influence of roll dynamics upon the resulting figure-of-merit FOM and increases the magnitude thereof for medium-speed roll events, for example, events having associated actuator firing times (time-to-tire TTF) of typically between 140 and 230 milliseconds. (The bounds of this range could be extended by 20% or more depending upon the vehicle characteristics, and could be further different for different types of vehicles). Compared with the force measure F* and with the rotational kinetic energy measure KE*, the potential energy measure PE* is relatively less significant, and could be ignored (e.g., by setting PE*=1) in a reduced rollover detection system 10. However, the potential energy measure PE* appears to be beneficial for the subset of roll event cases exhibiting intermediate actuator firing times.

The figure-of-merit FOM is then given by:

$$FOM(n^M) = |R(n^M)| \cdot |R(n^M)| - |R(n^M-1)|)$$

The figure-of-merit FOM is calculated from the absolute values of the associated $R(n^M)$ and $R(n^M-1)$ terms so that the figure-of-merit FOM is independent of the direction of roll. The term $(|R(n^M)| - |R(n^M-1)|)$ provides a measure of the derivative or slope of the measure function R with respect to time, wherein the actual slope would be given by dividing this term by the sampling period dt (a constant in uniformly sampled data systems). This slope factor, in combination with a threshold function described below, has the effect of requiring the figure-of-merit FOM to increase with time in order for a rollover event to be detected and for a resulting associated deployment of one or more safety restraint actuators 30.

Alternately, and particularly for relatively small values of $(|R(n^M)| - |R(n^M-1)|)$, the figure-of-merit FOM may be given by:

$$FOM(n^M) = |R(n^M)|$$

Following the algorithm calculations of step (322.1), the algorithm detection criteria evaluated in step (330.1) comprise a plurality of detection conditions, for example, as illustrated in FIG. 8c. If all of the detection conditions are satisfied—so that generally a measures event threshold is exceeded—then a rollover is considered likely to occur, and if in step (340), an associated safing criteria is satisfied from the safing algorithm 200, then in step (350), the associated one or more safety restraint actuators 30 are deployed so as to mitigate injury to the associated occupant or occupants. The detection criteria are established in accordance with a particular detection philosophy. Ideally, the detection criteria would provide for detection of any roll event for which there would be a head contact with the interior of the vehicle (i.e. a "head closure") of sufficient severity that injury to the occupant therefrom would be mitigated by a timely deployment of the associated one or more safety restraint actuators 30; and would provide for ignoring other events. However, if such ideal performance is not feasible, then the detection criteria can be adapted to provide a suitable compromise. For example, in order to detect severe roll events sufficiently fast—i.e. sufficiently sooner than the associated head closure time so that the associated one or more safety restraint actuators 30 can be actuated in time, and at a rate, so as to mitigate risk of injury to the occupant—it may be necessary to accept deployment of the associated one or more safety restraint actuators 30 responsive to severe rollover events that do not completely roll the vehicle (e.g. curb trip or mid-to-high-g deceleration type roll events).

As a first detection condition of step (330.1), the measures event time $\Delta t^M$ is tested to be within a range of measures event times ($\Delta t^M_{min}$, $\Delta t^M_{max}$), as follows:

$$\Delta t^M_{min} \leq \Delta t^M \leq \Delta t^M_{max}$$

For example, the associated minimum and maximum event times for one particular class of vehicles are $\Delta t^M_{min} = 40$ milliseconds and $\Delta t^M_{max} = 165$ milliseconds. So that the period of time elapsed since the event trigger falls within a particular time window. The minimum measures event time $\Delta t^{Mn}_{min}$ constraint prevents hard lateral input force events of very short duration from causing an inadvertent detection, while allowing for a sufficiently early safety restraint deployment to satisfy the earliest observed head closure times. (The head closure time is the time at which the head of an occupant contacts the interior of the vehicle). Typically, for severe curb trip or deceleration sled events, the roll discrimination algorithm entrance time would occur about 20 milliseconds after the start of the roll event (i.e. the beginning of the physical event). The earliest that the roll discrimination algorithm could begin to deploy the airbags would then be about 60 milliseconds after the start of the roll event (entrance time plus 40 milliseconds). The fastest observed head closure times are on the order of 115 milliseconds after the start of the roll event. Given that the associated data processing and safety restraint deployment (e.g. airbag inflation) takes about 30 milliseconds, the safety restraint actuator 30 would be fully deployed for these cases at about 90 milliseconds after the start of the roll event. The minimum fire time $\Delta t^{min}$ ensures that the information provided in the signals from lateral accelerometer 18 and angular rate sensor 20 has been utilized as much as possible while still enabling a deployment decision to be made in time to avoid head closure for severe events. The maximum firing time $\Delta t^{max}$ reduces the vulnerability of the roll discrimination algorithm to concatenated events, and may also enable the roll discrimination algorithm to reset and catch a second "real" initiator of a rollover in an accident where the second of two time-separated lateral events leads to rollover. If, in step (330.1), the measures event time $\Delta t^M$ is within the specified range, then the first detection condition is met, and additional detection criteria are evaluated in step (330.1). Otherwise, the process continues with step (150) for the next iteration.

As a second detection condition of step (330.1), the figure-of-merit FOM is compared with a threshold function $FOM^{Thr}(\Delta t^M)$ that, for the exemplary vehicle platform, provides for sufficiently fast discrimination times for substantially all events as necessary in accordance with the above-described detection philosophy. The threshold function $FOM^{Thr}(\Delta t^M)$, for example, has the following form:

$$FOM^{Thr}(\Delta t^M) = A \cdot \Delta t^M + B$$

The associated second detection condition is given by:

$$FOM(n^M) > FOM^{Thr}(\Delta t^M)$$

For example, based upon data from a set of rollover tests of a particular type of vehicle, A and B were given as $A = 6.46 \times 10^{11}$ ($g^2 deg^6/ms \cdot s^4$) and $B = -2.34 \times 10^{13}$ ($g^2 deg^6/s^4$) for (40 milliseconds $\leq \Delta t^M < 96$ milliseconds), and as $A = 2.59 \times 10^{11}$ ($g^2 deg^6/ms \cdot s^4$) and $B - 1.36 \times 10^{13}$ ($g^2 deg^6/s^4$) for (96 milliseconds $\leq \Delta t^M \leq 165$ milliseconds). The figure-of-merit FOM and the threshold function $FOM^{Thr}(\Delta t^M)$, for example, both have engineering units of [$g^2 deg^6/s^4$]. Generally, different types of vehicles would have either different parameter values or different functional forms for the threshold function $FOM^{Thr}(\Delta t^M)$. A multi-segmented threshold function $FOM^{Thr}(\Delta t^M)$, e.g. comprising a plurality of linear segments, has been found to be beneficial to the performance of the roll discrimination algorithm. The above exemplary threshold line was developed from data that was sampled at a rate of 1250 Hz for a time step of 0.8 milliseconds. The threshold function $FOM^{Thr}(\Delta t^M)$ would be different for different data sampling rates because of differences in the resultants of integrations involved in calculating the figure-of-merit FOM. Generally, the threshold function $FOM^{Thr}(\Delta t^M)$ could be represented by either a function of time, a piecewise function of time, or a table lookup with respect to time. Furthermore, whereas the threshold function $FOM^{Thr}(\Delta t^M)$ is generally a function of time—e.g. time period since inception—, it should be understood that this threshold function $FOM^{Thr}(\Delta t^M)$ could in some cases be constant, i.e. constant with respect to time. If, in step (330.1), the figure-of-merit FOM exceeds the threshold function $FOM^{Thr}(\Delta t^M)$ then the second detection condition is met, and additional detection criteria are evaluated in step (330.1). Otherwise, the process continues with step (150) for the next iteration.

As a third detection condition of step (330.1), the figure-of-merit FOM is tested to see if it is increasing in magnitude with respect to time at the time of prospective deployment of the safety restraint actuator(s) 30, as follows:

$$|FOM(n^M)|>|FOM(n^M-1)| \text{ AND}$$

$$|FOM(n^M)|>|FOM(n^M-m)|,$$

where m>1, e.g. m=6

The third detection condition is intended to prevent deployment in cases, for example, for which the threshold function $FOM^{Thr}(\Delta t)$ is exceeded, e.g. at $\Delta t=40$ milliseconds, but for which the event was decaying away (e.g. for which the magnitude of either $A_y$ or $\omega_x$ or both was decreasing). If, in step (330.1), the figure-of-merit FOM is increasing with respect to time, then the third detection condition is met and additional detection criteria are evaluated in step (330.1). Otherwise, the process continues with step (150) for the next iteration.

As a fourth detection condition of step (330.1), the magnitude compensated lateral acceleration component $A_y'$ at the time of prospective deployment of the safety restraint actuator(s) 30) is compared with a second acceleration threshold $A_y^{Thr-2}$, as follows:

$$|A_y'(n^M)|>A_y^{Thr-2}$$

The fourth detection condition prevents a failure of the angular rate sensor 20 in a mode that causes a large, false compensated angular velocity $\omega_x'$ signal from causing an inadvertent deployment of the safety restraint actuator(s) 30. For example, a second acceleration threshold $A_y^{Thr-2}$ value of 0.7 g would likely not be exceeded during normal driving conditions for which there is no lateral tire slip on the driving surface. If, in step (330.1), the magnitude compensated lateral acceleration component $A_y'$ greater than the second acceleration threshold $A_y^{Thr-2}$, then the fourth detection condition is met and additional detection criteria are evaluated in step (330.1). Otherwise, the process continues with step (150) for the next iteration.

As a fifth detection condition of step (330.1), the magnitude of the compensated angular velocity $\omega_x'$ is compared with an associated second roll rate threshold $\omega^{Thr-2}$ at the time of prospective deployment of the safety restraint actuator(s) 30, as follows:

$$|\omega_x'(n^M)|>\omega^{Thr-2}$$

For example, the second roll rate threshold $\omega^{Thr-2}$ is about 50 degrees/second. The fifth detection condition ensures that the vehicle 12 is experiencing significant angular velocity at the time of deployment of the safety restraint actuator(s) 30. The second and fifth detection conditions in combination prevent severe side impact events from deploying the safety restraint actuator(s) 30. The fifth detection condition also prevents a failed lateral accelerometer 18—indicating a large, false lateral acceleration signal—from causing an inadvertent deployment of the safety restraint actuator(s) 30. If, in step (330.1), the magnitude of the compensated angular velocity $\omega_x'$ is greater than the second roll rate threshold $\omega^{Thr-2}$, then the fifth detection condition is met, and the process continues with step (340). Otherwise, the process continues with step (150) for the next iteration.

The herein-described measures algorithm 300.1 has been successfully tested with data from a series of vehicle rollover tests, and has been demonstrated to provide a reliable prediction of eventual vehicle rollover. For roll events caused by high lateral acceleration, predictions can be made relatively quickly, which enables the measures algorithm 300.1 to deploy the airbags before head closure for the type of roll events where head closure typically occurs most rapidly. Generally, the measures algorithm 300.1 is beneficial in providing relatively early rollover detection and relatively early time-to-fire (TTF's) of the associated safety restraint actuator(s) 30, for short and medium time roll events, similar to curb trip and high-g lateral deceleration type events.

Accordingly, the rollover detection system 10 incorporating the measures algorithm 300.1 provides for improved discrimination of vehicle rollover that allows for rollover airbag deployment times that meet occupant head closure times while minimizing inadvertent deployments, by:

utilizing the measured lateral acceleration to aid in predicting future (20–30 ms later) roll motion;

combining lateral acceleration with angular speed and total rotation angle to produce a measure of the current rotation state and dynamics, and the forcing function that is producing the rotation, without requiring the use of initial vehicle angle information for roll events where the starting angle is less than about 20 degrees from horizontal; and utilizing vehicle specific dynamics properties (as derived from rollover test data) combined with early measured vehicle responses to allow for a prediction of eventual vehicle rollover before such outcome is definitive.

Referring to FIG. 10 four different vehicle test conditions—designated as Test A, Test B, Test C and Test D, are tabulated for purposes of illustrating and comparing the measures algorithm 300.1 and the energy algorithm 300.2 (the energy algorithm 300.2 is described more fully hereinbelow). Tests A and B are corkscrew type tests, which illustrate conditions for which the energy algorithm 300.2 exhibits faster rollover detection than the measures algorithm 300.1, and Tests C and D are deceleration sled tests for which the measures algorithm 300.1 exhibits faster rollover detection than the energy algorithm 300.2. The vehicle rolled over in Tests A and D, but did not roll over in Tests B and C, but rather achieved a maximum roll angle of 37 and 34 degrees respectively. The initial vehicle speed, average vehicle deceleration, and associated detection and event times are also tabulated in FIG. 10, wherein the head closure time is the time at which the head of the occupant (dummy) actual struck the interior of the vehicle.

Referring to FIGS. 11a–d, the filtered roll rate (angular rate) from an angular rate sensor 20, roll angle, and filtered lateral acceleration from a lateral accelerometer 18 are illustrated as a function of time for each of Tests A–D respectively in accordance with the conditions that are tabulated in FIG. 10.

Figure 12:
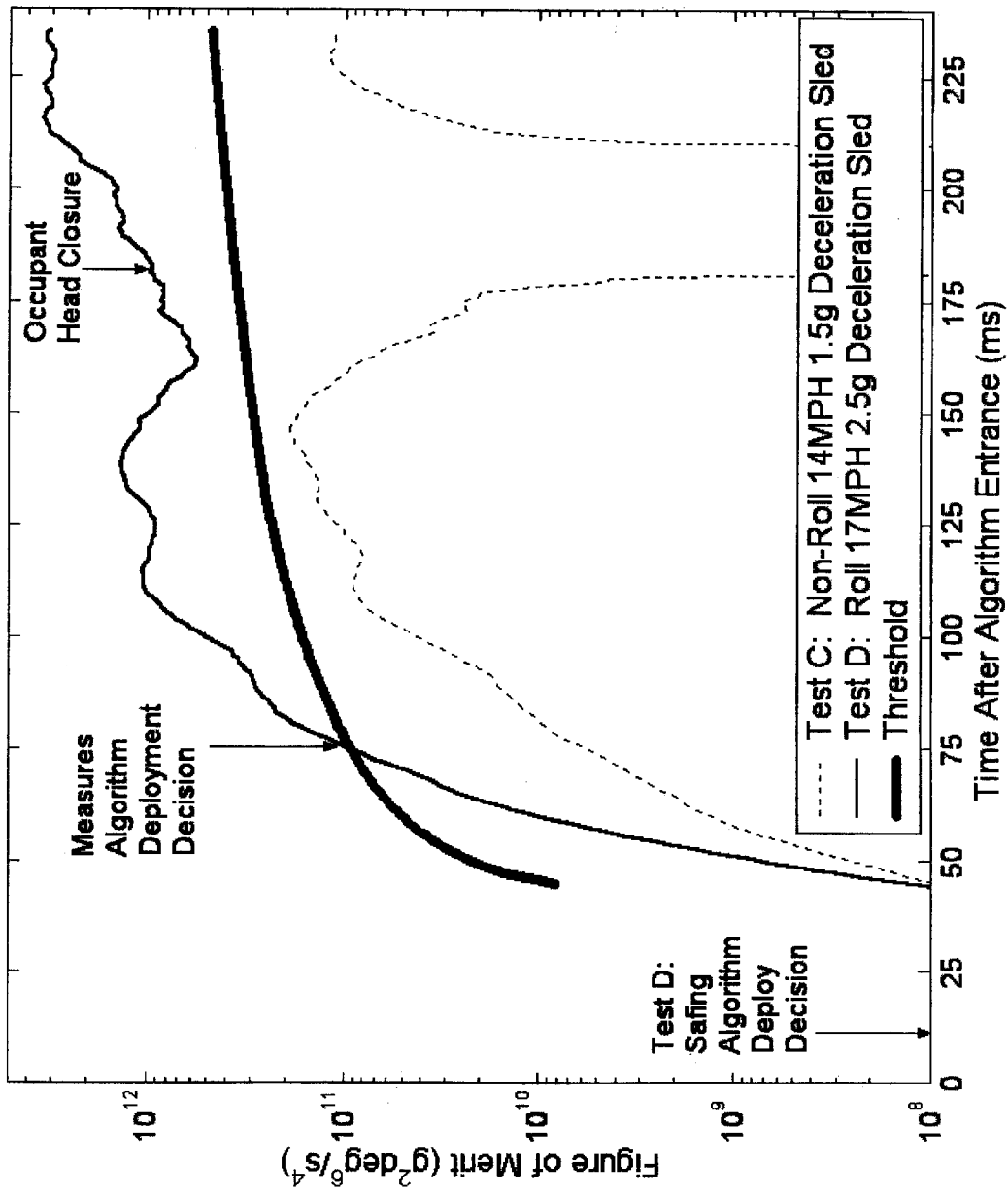
FIG. 12 illustrates plots of a figure-of-merit and an associated deployment threshold for a rollover measure as a function of time, in accordance with a measures algorithm, for the rollover event of Test D and the non-rollover event of Test C.

Referring to FIG. 12, the calculated figure-of-merit FOM is plotted for Tests C and D as a function of measures event time $\Delta t^M$, i.e. the time since inception of the measures algorithm 300.1 for actual sled deceleration tests of a particular type of vehicle in accordance with the table of FIG. 10. FIG. 12 also illustrates an associated threshold function FOM$^{Thr}(\Delta t^M)$ for the particular type of vehicle. Test D caused the vehicle to rollover and Test C reached a maximum rotation angle of about 34 degrees. The figure-of-merit FOM($n^M$) calculated by the herein-described measures algorithm 300.1 in conjunction with the associated threshold function FOM$^{Thr}(\Delta t^M)$, enabled a firing time (TTF) of 98 milliseconds after inception of the roll event for test D, for which the vehicle rolled over, which was substantially before the associated head closure time of 196 milliseconds, thereby providing 98 milliseconds within which to deploy the associated one or more safety restraint actuators 30. The safing criteria of associated safing algorithm 200 were satisfied 26 milliseconds after inception of the roll event, which was substantially before the detection criteria was satisfied by the measures algorithm 300.1. By comparison, the detection criteria of the hereinbelow described energy algorithm 300.2 were not satisfied for the event of Test D until 594 milliseconds after inception of the roll event, which was substantially after the associated head closure time, thereby illustrating the benefit of the measures algorithm 300.1 for the roll event of Test D.

Referring to FIG. 6, FIGS. 8a–c, and FIGS. 9a–b, the energy algorithm 300.2 will now be discussed with greater particularity, wherein the steps of FIG. 6 are suffixed with ".2" to indicate their association therewith. The ONGOING_EVENT_FLAG for energy algorithm 300.2—referred to as the ONGOING_ENERGY_EVENT_FLAG—is set in step (308.2) upon satisfaction of the entrance criteria in step (306.2), and is reset in step (320.2) upon satisfaction of the exit criteria in step (322.2). The ONGOING_ENERGY_EVENT_FLAG, for example, could correspond to a particular location in the memory 28 of the associated processor 26 that implements the energy algorithm 300.2. After entry following step (306.2), the energy algorithm 300.2 is not subsequently exited until either the energy event exit criteria is satisfied in step (322.2), or until a roll event is detected causing a deployment of the safety restraint actuators 30. Moreover, after the energy event exit criteria is satisfied and the energy algorithm 300.2 is exited, the energy algorithm 300.2 can be subsequently reentered if the associated energy event entrance criteria is subsequently satisfied.

The energy algorithm 300.2 utilizes the angular velocity $\omega_x$ signal from angular rate sensor 20 to determine the roll state of the vehicle and compare the total energy (rotational kinetic and potential) of the vehicle 12 with that needed to completely roll.

In step (306.2), the entrance criteria of the energy algorithm 300.2 is, for example, that the magnitude of the compensated lateral acceleration component $A_y'$ be greater than a first acceleration threshold $A_y^{Thr-1}$, OR that the magnitude of the compensated angular velocity $\omega_x'$ be greater than a first roll rate threshold $\omega^{Thr-1}$ i.e.:

$$|A_y'(n^E)|>A_y^{Thr-1} \text{ OR } |\omega_x'(n^E)|>\omega^{Thr-1}$$

For an example of a particular type of vehicle, based upon actual rollover data, the first acceleration threshold $A_y^{Thr-1}$ was set to about 1.4 g (as for the measures algorithm 300.1) and the first roll rate threshold $\omega^{Thr-1}$ was set to about 19 degrees/second. It should be recognized that this threshold value, as well as the value of the other parameters of the energy algorithm 300.2, is generally dependent upon the characteristics of the particular associated vehicle 12 or class of vehicles, and that the particular value used for a particular rollover detection system 10 can be adjusted for improved discrimination dependent upon the nature of the associated vehicle 12 or class of vehicles.

In step (310.2), upon initial entrance to the energy algorithm 300.2 following step (306.1), the energy algorithm 300.2 is initialized. An event sample count $n^E$ and the value of angular position $\theta^E(-1)$ are initialized—e.g. to values of zero. Also the sampled time $t^E(-1)$ just prior to the time of event entrance is initialized to a value of the time of energy event entrance $\theta^E(0)$, which is initialized to a value of the current time t; and the time period $\Delta t^E(0)$ since algorithm entrance is initialized to a value of zero. Furthermore, a second event sample count $n_\omega^E$ is initialized to zero, as is a time period $\Delta t^{E*}$ since roll direction change. The superscript "E" used herein refers to variables associated with the energy algorithm 300.2.

Upon subsequent iteration of the energy algorithm 300.2, if, in step (304.2), the ONGOING_ENERGY_EVENT_FLAG is set, then, in step (312.2), the event sample count $n^E$ is incremented, the associated current sampled time $t^E(n^E)$ is set equal to the current time t, and the energy event time $\Delta t^E$ is calculated as the period extending from the time of energy event entrance $t^E(0)$ to the current time $t^E(n^E)$ as follows:

$$\Delta t^E(n^E)=t^E(n^E)-t^E(0)$$

In step (322.2), one exit criteria of the energy algorithm 300.2 is, for example, that the energy event time $\Delta t^E$ be greater than a maximum time period threshold $\Delta t_{max}^E$, i.e.:

$$\Delta t^E(n^E)>\Delta t_{max}^E$$

Another exit criteria of the energy algorithm 300.2 is, for example, that the energy event time $\Delta t^E$ be greater than a minimum time period threshold $\Delta t_{min}^E$, and that the time period since the entrance criteria of step (306.2) was most recently satisfied is greater than a second time period threshold $\Delta t_{Event}^E$, i.e., as follows:

$$\Delta t^E(n^E)>\Delta t_{min}^E \text{ AND } \Delta t^E(n^E)-\Delta t^{E*}>\Delta t_{Event}^E$$

The energy algorithm 300.2 requires a substantially longer period of time than the measures algorithm 300.1 before being restarted (i.e. exited and reset) because of possibility of relatively slow rollover events. For the example of a particular type of vehicle, based upon actual rollover data, the time period threshold $\Delta t_{max}^E$ was set to about 12 seconds, the minimum time period threshold $\Delta t_{min}^E$ was set to about 4 seconds, and the second time period threshold $\Delta t_{Event}^E$ was set to about 2 seconds. Accordingly, for this example, the energy algorithm 300.2 is executed for at least 4 seconds but not more than 12 seconds, and subject to these limitations, is exited if the time period since the entrance criteria was most recently satisfied exceeds 2 seconds. Upon exit from the energy algorithm 300.2, the ONGOING_ENERGY_EVENT_FLAG is reset in step (320.2), after which a subsequent satisfaction of the entrance criteria in step (306.2) causes the variables associated with the energy algorithm 300.2 to be initialized in step (310.2).

If, in step (322.2), the exit criteria is not satisfied, then the algorithm calculations are updated in step (326.2) for the particular iteration of the energy algorithm 300.2, as follows.

First the angular position $\theta^E$ is estimated by integrating the signed value of the compensated angular velocity $\omega_x'$ as follows:

$$\theta^E(n^E)=\theta^E(n^E-1)+\omega_x'(n^E)\cdot dt$$

wherein the integration time step dt is given by the difference between the time $t^E(n^E)$ at the current iteration, and the time at the previous iteration $t^E(n^E-1)$—which difference would be constant for a uniform sampling rate—as follows:

$$dt = t^E(n^E) - t^E(n^E - 1)$$

and the compensated angular velocity $\omega_x'$ is given by:

$$\omega_x'(t) = \omega_x(t) - \omega_x^{Offset}(t)$$

In step (326.2), the algorithm calculations are further adapted to compensate for offsets in the angular velocity $\omega_x$ signal due either to gyroscope error, or to an offset as a result of significant vehicle motion, that may not otherwise be adequately compensated in the compensated angular velocity $\omega_x'$, particularly for rough road conditions for which the angular velocity $\omega_x$ signal may exhibit substantial oscillatory behavior. The energy algorithm 300.2 does not exit for at least $\Delta t_{Event}^E$ seconds, e.g. 2 seconds, following the most recent time at which the algorithm entrance criteria were satisfied, which thereby provides for extending the duration of the energy algorithm 300.2 for up to $\Delta t_{max}^E$ seconds, e.g. 12 seconds, which can lead to a substantial roll angle integration errors (e.g. 24 to 36 degrees) for a relatively small offset—e.g. 2–3 degrees/second—in the signal from the angular rate sensor 20. On a rough road, the vehicle 12 can exhibit substantial oscillatory roll motion, and a "rough road event" would be characterized by and angular velocity $\omega_x$ that oscillates about the true angular velocity offset $\overline{\omega}_x^{Offset}(t)$. For example, referring to FIG. 13, an angular velocity $\omega_x$ signal having a true angular velocity offset $\overline{\omega}_x^{Offset}(t)$ of $-6.5$ degrees/second is plotted as a function of time. Because typical roll events do not exhibit a change in sign of compensated angular velocity $\omega_x'$ during the roll event, it is possible to recognize a rough road condition from oscillation in the compensated angular velocity $\omega_x'$ signal. Under these conditions, the integrated roll angle $\theta^E$ is damped toward zero degrees every time the compensated angular velocity $\omega_x'$ changes sign, according to the following equation:

$$\theta^E(n^E) = \theta^E(n^E - 1) \cdot \mathrm{MAX}\left(\frac{1024 - (n^E - n_\omega^E)}{1024}, 0.5\right) \text{ and}$$

$$n_\omega^E = n^E$$

wherein the counter $n_\omega^E$ is set equal to the event sample count at the time of reversal, which provides for damping the roll angle $\theta^E$ by an amount between 0.1% and 50% each time the compensated angular velocity $\omega_x'$ changes direction, depending upon the period of time since the most recent change of direction.

Figure 13:
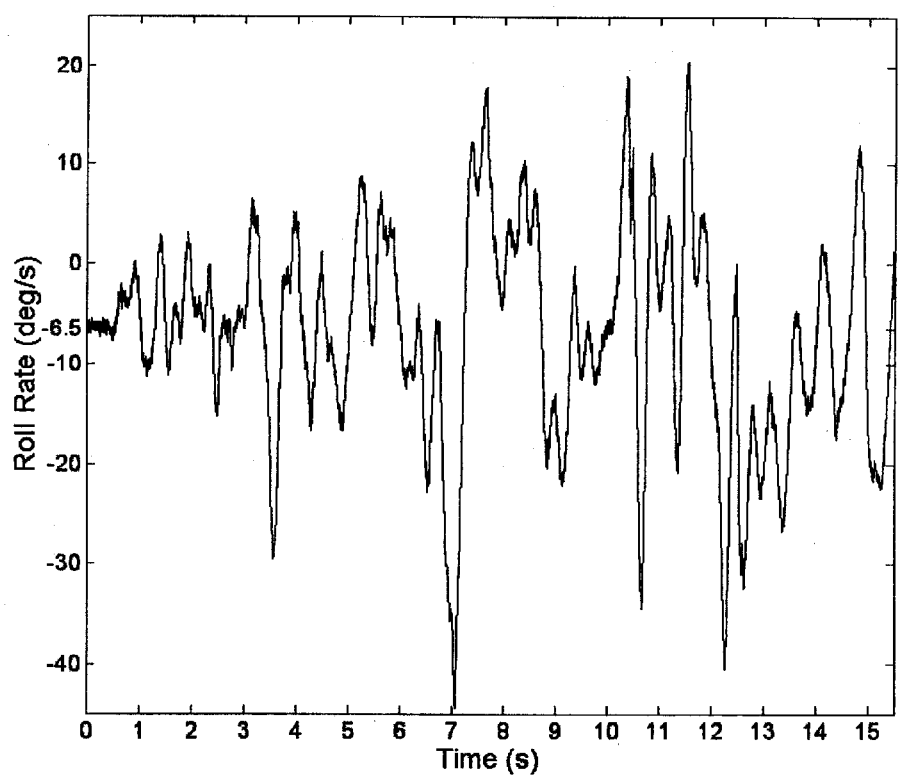
FIG. 13 illustrates a plot of roll rate as a function of time for a signal having a roll rate offset.
Figure 14:
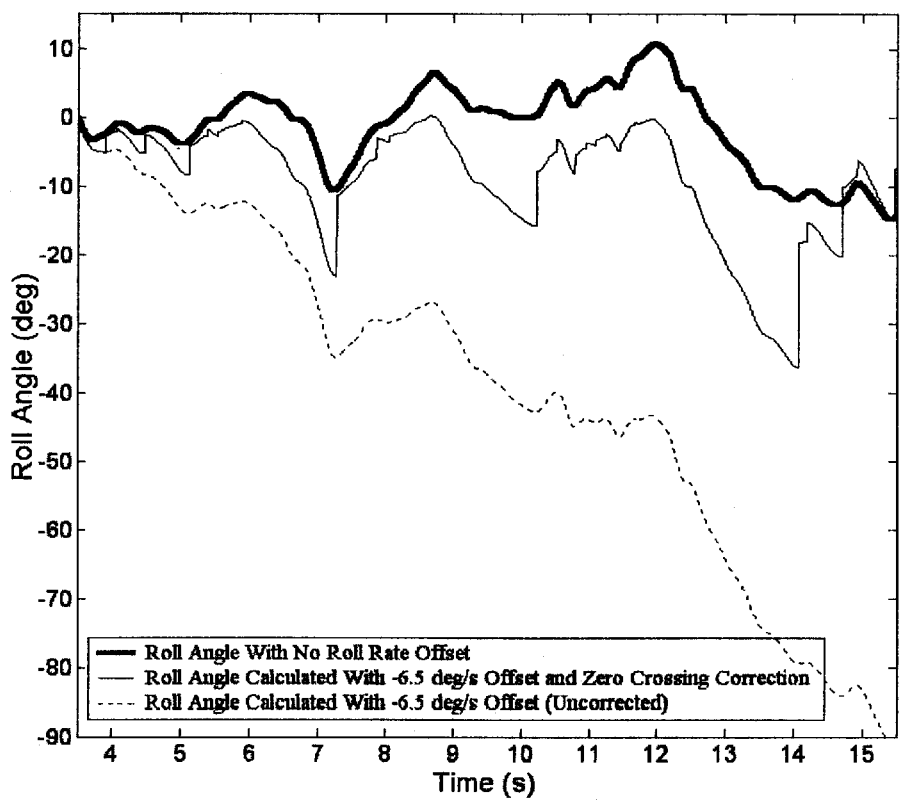
FIG. 14 illustrates plots of roll angle as a function of time based upon the data of FIG. 13, for various associated processes for determining roll angle from roll rate.

Referring to FIG. 14, the affect of the above-described compensation for the roll oscillation effect is illustrated, wherein the roll angle $\theta^E$, integrated from the angular velocity $\omega_x$ (roll rate) data plotted in FIG. 13, is plotted as a function of time for various conditions. As the first condition, the true angular velocity offset $\overline{\omega}_x^{Offset}$ of $-6.5$ degrees/second is removed prior to integration. As the second condition, the roll angle $\theta^E$ is integrated from the biased angular velocity $\omega_x$ data, and then compensated for roll oscillation as described hereinabove. As the third condition, the roll angle $\theta^E$ is integrated from the biased angular velocity $\omega_x$ data without the above-described compensation for roll oscillation, which illustrates the potential for false detection of a roll event as a result of an uncompensated angular velocity $\omega_x$ bias for relatively long integration intervals. The above-described compensation for roll oscillation substantially corrects for roll-oscillation induced integration errors, without adversely affecting the detection of an actual roll event for which the angular velocity $\omega_x$ is substantially unidirectional.

In step (326.2), the algorithm calculations further provide for recording the latest time at which the entrance criteria of step (306.2) are satisfied, so as to provide a supplemental basis for the exit criteria of step (322.2), as follows:

If $|A_y'(n^E)| > A_y^{Thr-1}$ OR $|\omega_x'(n^E)| > \omega_x^{Thr-1}$ then $\Delta t^{E'} = \Delta t^E$ Following the algorithm calculations of step (322.2), the algorithm detection criteria evaluated in step (330.2) comprise a plurality of detection conditions, for example, as illustrated in FIG. 8c. If all of the detection conditions are satisfied—so that generally an energy event threshold is exceeded—then a rollover is considered likely to occur, and if in step (340), an associated safing criteria is satisfied from the safing algorithm 200, then in step (350), the associated one or more safety restraint actuators 30 are deployed so as to mitigate injury to the associated occupant or occupants. The detection criteria of the energy algorithm 300.2 are established in accordance with a detection philosophy similar to that described hereinabove for the measures algorithm 300.1.

Figure 15:
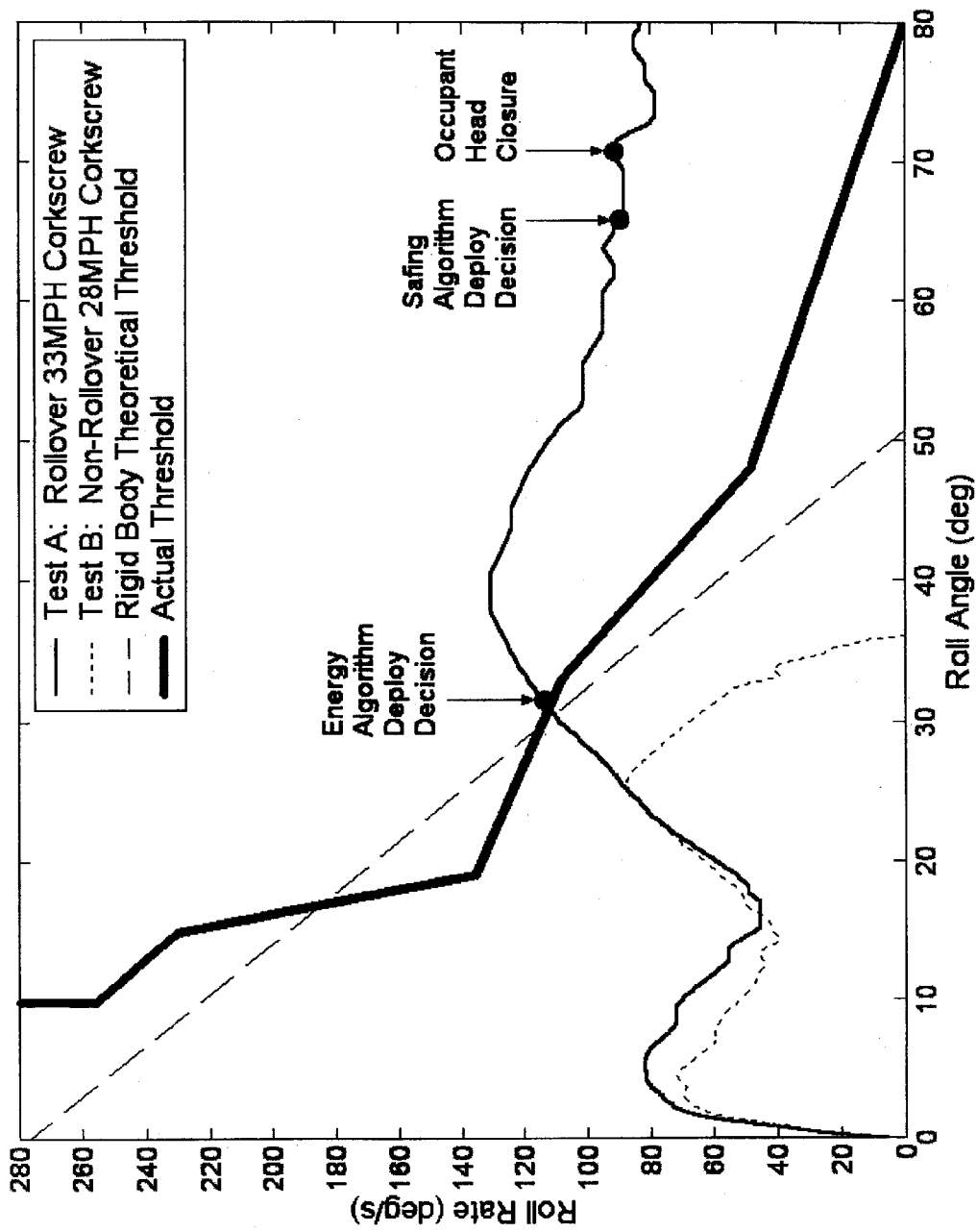
FIG. 15 illustrates plots of roll rate as a function roll angle, and plots of associated rollover thresholds, in accordance with an energy algorithm, for the rollover event of Test A and the non-rollover event of Test B.

The principal detection criteria of the energy algorithm 300.2 are based upon the behavior of the compensated angular velocity $\omega_x'$ and roll angle $\theta^E$, and the associated trajectory thereof, in the associated phase-space of angular velocity and roll angle (i.e. the $\omega$-$\theta$ phase-space). An example of the $\omega$-$\theta$ phase-space is illustrated in FIG. 15.

In accordance with rigid body dynamics, there exists a theoretical threshold boundary in phase-space that distinguishes between roll and non-roll events of an associated rigid body. For example, this theoretical threshold boundary is given by:

$$\omega^{Thr}(\theta) = \sqrt{\frac{2mg \cdot \left[\frac{T^2}{4} + h_{CG}^2\right]^{1/2} \cdot \left[1 - \sin\left(\theta + \tan^{-1}\left(\frac{2h_{CG}}{T}\right)\right)\right]}{I}}$$

where mg is the weight of the vehicle, T is the vehicle track width, I is the vehicle moment of inertia in roll, and $h_{CG}$ is the height of the vehicle center of gravity. This equation is nearly linear in the $\omega$-$\theta$ plane over the region of interest. However, because of non-rigid body effects, the practical threshold boundary is beneficially modeled as a piecewise-linear boundary comprising, for example, a series of about 5 or 6 connected line segments that generally follow the above theoretical threshold boundary, but which can be tailored for a particular vehicle 12 or vehicle platform to improve discrimination between roll and non-roll events. Generally, this boundary could be represented by either a function in phase-space (e.g. a function of roll angle $\theta$), a piecewise function in phase-space (e.g. a piecewise function of roll angle $\theta$), or a table lookup in phase-space. Referring to FIG. 15, actual rollover test data—filtered using the hereinabove-described running average filter—for Tests A and B of FIGS. 11a and 11b respectively, in accordance with the conditions of FIG. 10, is plotted in the $\omega$-$\theta$ phase-space, together with an example of the associated theoretical threshold boundary and an example of a practical, piecewise-linear threshold boundary.

The distance between the current ordered pair $(\omega_x'(n^E), \theta^E(n^E))$ and the linear segment of the practical threshold boundary is calculated for each iteration for the linear segment whose associated endpoint angle values $\theta_k$, $\theta_{k+1}$ bound the current roll angle $\theta^E(n^E)$. Each linear segment of the practical threshold boundary is defined by its endpoints $(\omega_k, \theta_k)$ and $(\omega_{k+1}, \theta_{k+1})$. The distance D between the current ordered pair and the appropriate linear segment of the practical threshold boundary is given by:

$$D(\tilde{\omega}_x, \theta^E, n^E, k) =$$

$$\frac{[(\omega_{k+1} - \omega_k) \cdot (\theta^E(n^E) - \theta_k) - (\theta_{k+1} - \theta_k) \cdot (|\omega'_x(n^E)| - \omega_k)]}{\sqrt{(\theta_{k+1} - \theta_k)^2 + (\omega_{k+1} - \omega_k)^2}}$$

whereby, if this distance is less than zero, then the practical threshold boundary has been crossed.

The slope of the trajectory of $(\omega_x'(n^E), \theta^E(n^E))$ in the $\omega$-$\theta$ phase-space is given by:

$$Slope(n^E) = \frac{\omega'_x(n^E) - \omega'_x(n^E - 1)}{\theta^E(n^E) - \theta^E(n^E - 1)}$$

and the associated angle of this slope in the $\omega$-$\theta$ phase-space is given by:

$$\beta = \tan^{-1}\left(Slope(n^E) \cdot \frac{180}{\pi}\right)$$

If, in step (330.2), the angle $\beta$ is within limits (i.e. $\beta^{min} < \beta < \beta^{max}$, where e.g. $\beta^{min} = 75$ degrees and $\beta^{max} = 90$ degrees), the magnitude of the roll rate is increasing with time (i.e. $|\omega_x'(n^E)| - |\omega_x'(n^E - 1)| > 0$), the distance in to the practical threshold boundary is less than zero (i.e. $D(\omega_x', \theta^E, n^E, k) < 0$) and the roll angle $\theta^E$ is greater than a roll angle threshold $\theta^{Thr}$ (i.e. $|\theta^E| > \theta^{Thr}$, where e.g. $\theta^{Thr} = 10$ degrees), then the energy detection criteria are satisfied. Alternately, the energy detection criteria are satisfied if the distance in $\omega$-$\theta$ phase-space is less than a threshold $D^{Thr}$ (i.e. $D(\omega_x', \theta^E, n^E, k) < D^{Thr}$, where e.g. $D^{Thr} = -2.5$ $\sqrt{deg^2 + (deg/sec)^2}$) and the roll angle $\theta^E$ is greater than the roll angle threshold $\theta^{Thr}$ (i.e. $|\theta^E| > \theta^{Thr}$). If the energy detection criteria are satisfied in step (330.2), and if, in step (340), the safing criteria are satisfied, then, in step (350), the associated one or more safety restraint actuators 30 are deployed so as to mitigate injury to the associated occupant or occupants.

The energy algorithm 300.2 deployment decision is not latched, so that, if the safing criteria has not been satisfied by the time the detection criteria of the energy algorithm 300.2 is satisfied, then the energy algorithm 300.2 continues to be iterated until either the safing criteria is satisfied, or the energy algorithm 300.2 is otherwise exited in step (322.2).

It should be understood that the measures algorithm 300.1 and the energy algorithm 300.2 can be executed in series or in parallel, on a common processor 26 or on separate processors 26. If executed in series, then the steps illustrated in FIG. 6 for one iteration are completed for one of the algorithms, then the other algorithm would commence with either step (302) for the first pass, or step (150) for subsequent passes.

Whereas the rollover detection algorithm has been illustrated with equations in a particular form, it should be understood that these calculations may be implemented on a particular processor 26 in a variety of ways without departing from the scope of the teachings herein. For example, the particular calculations described herein may require modification in order to be practically implemented on a particular processor, for example, depending upon the resolution of associated analog-to-digital converters, and the type and precision of mathematical operations that can be performed by the particular processor 26, and the preferred word size of the particular processor 26.

Whereas the roll discrimination algorithm is illustrated herein as applied to sampled data, it should be understood that the algorithm could also be implemented continuously, for example using an analog processor. Moreover, it should be understood that the event sample count $n^M$ may be either explicit or implicit in the actual implementation of the roll discrimination algorithm, and that the associated time-dependent variables can be expressed as functions of either time t or event sample count $n^M$, $n^E$.

Whereas the measures algorithm 300.1 and the energy algorithm 300.2 have been illustrated as utilizing a measure of roll angle that is found by integrating the associated compensated angular velocity $\omega_x'$ it should that a measured roll angle, e.g. from an incline sensor, could be used instead of a calculated roll angle.

The parameters of the herein-described roll discrimination algorithm are derived from associated test data, and may require adjustment if applied to other types of vehicles than for those for which the parameters were derived, wherein a criteria for the adjustment is, for example, robust and early detection of rollover events while also avoiding, to the extent possible, falsely discriminating non-rollover events as rollover events. The particular values for various parameters described herein are not considered to be limiting, and for example may be different for different types of vehicles, which may have different susceptibilities to rollover. For example, a vehicle with a relatively high center of gravity or a relatively narrow wheel-base—e.g. a sport-utility vehicle—would be more susceptible to rollover than a vehicle having a relatively low center of gravity or a relatively wide wheel-base—e.g. a passenger sedan. Furthermore, the rollover detection system 10 as could also be adapted to sense pitchover events, i.e. about the local Y-axis of the vehicle, by providing an associated longitudinal accelerometer and a pitch rate sensor.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth the appended claims, and any and all equivalents thereof.

We claim:

1. A method of providing for detecting a rollover condition in a vehicle, comprising:

a. providing for acquiring a measure of lateral acceleration of the vehicle;

b. providing for acquiring a measure of angular velocity of the vehicle;

c. providing for determining a figure of merit responsive to said measure of lateral acceleration and said measure of angular velocity;

d. providing for determining a time of inception responsive to at least one of said measure of lateral acceleration and said measure of angular velocity;

e. providing for determining a period of time commencing with said time of inception;

f. providing for determining a figure of merit threshold as a function of said period of time; and g. providing for detecting the rollover condition by comparing said figure of merit with said figure of merit threshold.

2. A method of providing for detecting a rollover condition in a vehicle as recited in claim 1, further comprising providing for filtering at least one of said measure of lateral acceleration and said measure of angular velocity, wherein said operation of filtering comprises a first filtering operation having a first filtering characteristic and a second filtering operation having a second filtering characteristic.

3. A method of providing for detecting a rollover condition in a vehicle as recited in claim 2, wherein said first filtering characteristic comprises a first time constant, said second filtering characteristic comprises a second time constant, and said second time constant exceeds said first time constant.

4. A method of providing for detecting a rollover condition in a vehicle as recited in claim 2, wherein said second filtering operation is suspended after said time of inception, and said second filtering operation is resumed after a second period of time following said time of inception.

5. A method of providing for detecting a rollover condition in a vehicle as recited in claim 1, wherein said measure of angle is determined from an integration of said measure of angular velocity since said time of inception.

6. A method of providing for detecting a rollover condition in a vehicle as recited in claim 2, wherein said measure of angular velocity is compensated by an angular velocity offset measure from said second filtering operation.

7. A method of providing for detecting a rollover condition in a vehicle as recited in claim 2, wherein said measure of lateral acceleration is compensated by an acceleration offset measure from said second filtering operation.

8. A method of providing for detecting a rollover condition in a vehicle as recited in claim 1, wherein said time of inception is determined by at least one of a magnitude of said measure of lateral acceleration exceeding a first acceleration threshold and a magnitude of said measure of angular velocity exceeding a first angular velocity threshold.

9. A method of providing for detecting a rollover condition in a vehicle as recited in claim 1, wherein said figure of merit is responsive to a measure function, and said measure function comprises a product term comprising a product of a measure of force and a measure of rotational kinetic energy.

10. A method of providing for detecting a rollover condition in a vehicle as recited in claim 9, wherein said measure of force is responsive to said measure of lateral acceleration.

11. A method of providing for detecting a rollover condition in a vehicle as recited in claim 9, wherein said measure of rotational kinetic energy is responsive to said measure of angular velocity.

12. A method of providing for detecting a rollover condition in a vehicle as recited in claim 9, wherein said product term further comprises a product of a measure of potential energy.

13. A method of providing for detecting a rollover condition in a vehicle as recited in claim 12, further comprising the operation of providing for determining or acquiring a measure of angle of the vehicle, wherein said measure of potential energy is responsive to said measure of angle.

14. A method of providing for detecting a rollover condition in a vehicle as recited in claim 9, wherein said measure function further comprises a previous value of said measure function.

15. A method of providing for detecting a rollover condition in a vehicle as recited in claim 14, wherein said measure function further comprises a damping term.

16. A method of providing for detecting a rollover condition in a vehicle as recited in claim 9, wherein said figure of merit comprises a product of a present value of said measure function and a difference between a present value of said measure function and a past value of said measure function.

17. A method of providing for detecting a rollover condition in a vehicle as recited in claim 1, wherein the operation of detecting the rollover condition comprises a time-domain detection process.

18. A method of providing for detecting a rollover condition in a vehicle as recited in claim 1, wherein the operation of detecting the rollover condition is further responsive to said period of time being greater than a fourth time period threshold and less than a second time period threshold.

19. A method of providing for detecting a rollover condition in a vehicle as recited in claim 1, wherein the operation of detecting the rollover condition is further responsive to a magnitude of said measure of lateral acceleration being greater than a second acceleration threshold.

20. A method of providing for detecting a rollover condition in a vehicle as recited in claim 1, wherein the operation of detecting the rollover condition is further responsive to a magnitude of said measure of angular velocity being greater than a second angular velocity threshold.

21. A method of providing for detecting a rollover condition in a vehicle as recited in claim 17, wherein said rollover condition is detected responsive to said figure of merit being greater than said figure of merit threshold.

22. A method of providing for detecting a rollover condition in a vehicle as recited in claim 17, wherein said figure of merit threshold is a function of said time period.

23. A method of providing for detecting a rollover condition in a vehicle as recited in claim 22, wherein said figure of merit is increasing in magnitude with respect to time.

24. A method of providing for detecting a rollover condition in a vehicle as recited in claim 21, wherein the operation of detecting the rollover condition is further responsive to said figure of merit increasing in magnitude with respect to time.

25. A method of providing for detecting a rollover condition in a vehicle as recited in claim 1, further comprising providing for determining from at least one of said measure of lateral acceleration and said measure of angular velocity if a safing criteria is satisfied.

26. A method of providing for detecting a rollover condition in a vehicle as recited in claim 25, wherein said safing criteria is satisfied if at least one of a magnitude of said measure of lateral acceleration exceeds an third acceleration threshold at a first point of time following said time of inception, and a magnitude of said measure of angular velocity exceeds a third angular velocity threshold at a second point of time following said time of inception, wherein said first point of time and said second point of time are arbitrary with respect to one another.

27. A method of providing for detecting a rollover condition in a vehicle as recited in claim 25, wherein the operation of detecting the rollover condition is further responsive to whether said safing criteria is satisfied.

28. A method of providing for detecting a rollover condition in a vehicle as recited in claim 1, further comprising providing for controlling an activation of safety restraint system responsive to detection of a rollover condition.

29. A method of providing for detecting a rollover condition in a vehicle as recited in claim 27, further comprising providing for controlling an activation of safety restraint system responsive to detection of a rollover condition.

30. A method of providing for detecting a rollover condition in a vehicle as recited in claim 1, further comprising providing for recalibrating at least one of an acceleration sensor that provides said measure of lateral acceleration and an angular velocity sensor that provides said measure of angular velocity responsive to at least one of a magnitude of said measure of angular velocity continuously being greater than a fourth angular velocity threshold for more than a fifth time period threshold, a magnitude of said measure of angle being continuously greater than an angle threshold for more than a sixth time period threshold, and a magnitude of said measure of lateral acceleration being continuously greater than a fourth acceleration threshold for more than a seventh time period threshold.

31. A method of providing for detecting a rollover condition in a vehicle as recited in claim 1, further comprising:
   a. providing for determining or acquiring a measure of angle of the vehicle;
   b. providing for determining a second time of inception responsive to at least one of said measure of lateral acceleration and said measure of angular velocity;
   c. providing for determining a measure of distance in a phase space of said measure of angular velocity and said second measure of angle, wherein said measure of distance is from a threshold function in said phase space; and
   d. providing for detecting said rollover condition responsive to said measure of distance in said phase space.

32. A method of providing for detecting a rollover condition in a vehicle, comprising:
   a. providing for acquiring a measure of lateral acceleration;
   b. providing for acquiring a measure of roll rate;
   c. providing for determining if a first memory has been set indicating the activation of a first rollover detection algorithm, and if said first memory has not been set, then providing for determining from at least one of said measure of lateral acceleration and said measure of roll rate, if a first entrance criteria is satisfied for said first rollover detection process, and if said first entrance criteria is satisfied, then performing a set of initialization operations comprising:
      i. setting said first memory indicating the activation of a first rollover detection algorithm; and
      ii. initializing at least one second memory associated with said first rollover detection algorithm;
   d. providing for determining if a first exit criteria is satisfied for said first rollover detection process, and if said first exit criteria is satisfied, then resetting said first memory;
   e. if said first memory has been set, then providing for determining or acquiring a measure of roll angle;
   f. if said first memory has been set, then providing for determining a detection measure of said rollover condition responsive to at least two of said measure of lateral acceleration, said measure of roll rate, and said measure of roll angle; and
   g. providing for detecting said rollover condition responsive to said detection measure.

33. A method of providing for detecting a rollover condition in a vehicle as recited in claim 32, further comprising providing for filtering at least one of said measure of lateral acceleration and said measure of angular velocity, wherein said operation of filtering comprises a first filtering operation having a first filtering characteristic and a second filtering operation having a second filtering characteristic.

34. A method of providing for detecting a rollover condition in a vehicle as recited in claim 33, wherein said first filtering characteristic comprises a first time constant, said second filtering characteristic comprises a second time constant, and said second time constant is greater than said first time constant.

35. A method of providing for detecting a rollover condition in a vehicle as recited in claim 33, wherein said second filtering operation is suspended after said time of inception, and said second filtering operation is resumed after a second period of time following said time of inception.

36. A method of providing for detecting a rollover condition in a vehicle as recited in claim 32, wherein said entrance criteria is satisfied if at least one of a magnitude of said measure of lateral acceleration exceeds a first acceleration threshold and a magnitude of said measure of angular velocity exceeds a first angular velocity threshold.

37. A method of providing for detecting a rollover condition in a vehicle as recited in claim 32, wherein said exit criteria is satisfied if a first period of time since said time of inception exceeds a first time period threshold.

38. A method of providing for detecting a rollover condition in a vehicle as recited in claim 32, wherein said exit criteria is satisfied if a first period of time since said time of inception exceeds a second time period threshold and a difference between said first period of time and a second period of time exceeds a third time period threshold, wherein said second period of time is measured since said entrance criteria was most recently satisfied, wherein said second time period threshold is less than said first time period threshold.

39. A method of providing for detecting a rollover condition in a vehicle as recited in claim 32, wherein said measure of angle is determined from an integration of said measure of angular velocity since said time of inception.

40. A method of providing for detecting a rollover condition in a vehicle as recited in claim 33, wherein said measure of angular velocity is compensated by an angular velocity offset measure from said second filtering operation.

41. A method of providing for detecting a rollover condition in a vehicle as recited in claim 33, wherein said measure of lateral acceleration is compensated by an acceleration offset measure from said second filtering operation.

42. A method of providing for detecting a rollover condition in a vehicle as recited in claim 32, wherein said measure of angle is compensated responsive to a change in direction of said measure of angular velocity.

43. A method of providing for detecting a rollover condition in a vehicle as recited in claim 32, wherein said figure of merit is responsive to a measure function, and said measure function comprises a product term comprising a product of a measure of force and a measure of rotational kinetic energy.

44. A method of providing for detecting a rollover condition in a vehicle as recited in claim 43, wherein said measure of force is responsive to said measure of lateral acceleration.

45. A method of providing for detecting a rollover condition in a vehicle as recited in claim 43, wherein said measure of rotational kinetic energy is responsive to said measure of angular velocity.

46. A method of providing for detecting a rollover condition in a vehicle as recited in claim 43, wherein said product term further comprises a product of a measure of potential energy.

47. A method of providing for detecting a rollover condition in a vehicle as recited in claim 46, further comprising the operation of providing for determining or acquiring a measure of angle of the vehicle, wherein said measure of potential energy is responsive to said measure of angle.

48. A method of providing for detecting a rollover condition in a vehicle as recited in claim 43, wherein said measure function further comprises a previous value of said measure function.

49. A method of providing for detecting a rollover condition in a vehicle as recited in claim 48, wherein said measure function further comprises a damping term.

50. A method of providing for detecting a rollover condition in a vehicle as recited in claim 43, wherein said figure of merit comprises a product of a present value of said measure function and a difference between a present value of said measure function and a past value of said measure function.

51. A method of providing for detecting a rollover condition in a vehicle as recited in claim 32, wherein said detection measure is responsive to a measure of distance in a phase space of said measure of angular velocity and said measure of angle, and said measure of distance is from a threshold function in said phase space.

52. A method of providing for detecting a rollover condition in a vehicle as recited in claim 51, wherein said threshold function comprises either a function in phase space, a piecewise function in phase space, or a table lookup in phase space.

53. A method of providing for detecting a rollover condition in a vehicle as recited in claim 51, wherein said detection measure is responsive to said measure of distance in said phase space being less than a distance threshold.

54. A method of providing for detecting a rollover condition in a vehicle as recited in claim 51, wherein said detection measure is responsive to a slope of a trajectory of said measure of angular velocity and said measure of angle in phase space.

55. A method of providing for detecting a rollover condition in a vehicle as recited in claim 54, wherein said detection measure is responsive to an angle corresponding to said slope being greater than a first angle threshold and less than a second angle threshold.

56. A method of providing for detecting a rollover condition in a vehicle as recited in claim 32, wherein the operation of detecting the rollover condition comprises a time-domain detection process.

57. A method of providing for detecting a rollover condition in a vehicle as recited in claim 56, wherein the operation of detecting the rollover condition is further responsive to said period of time being greater than a fourth time period threshold and less than a second time period threshold.

58. A method of providing for detecting a rollover condition in a vehicle as recited in claim 32, wherein the operation of detecting the rollover condition is further responsive to a magnitude of said measure of lateral acceleration being greater than a second acceleration threshold.

59. A method of providing for detecting a rollover condition in a vehicle as recited in claim 32, wherein the operation of detecting the rollover condition is further responsive to a magnitude of said measure of angular velocity being greater than a second angular velocity threshold.

60. A method of providing for detecting a rollover condition in a vehicle as recited in claim 43, wherein said rollover condition is detected responsive to said figure of merit being greater than said figure of merit threshold.

61. A method of providing for detecting a rollover condition in a vehicle as recited in claim 60, wherein said figure of merit threshold is a function of said time period.

62. A method of providing for detecting a rollover condition in a vehicle as recited in claim 60, wherein said figure of merit is increasing in magnitude with respect to time.

63. A method of providing for detecting a rollover condition in a vehicle as recited in claim 43, wherein the operation of detecting the rollover condition is further responsive to said figure of merit increasing in magnitude with respect to time.

64. A method of providing for detecting a rollover condition in a vehicle as recited in claim 32, further comprising providing for determining from at least one of said measure of lateral acceleration and said measure of angular velocity if a safing criteria is satisfied.

65. A method of providing for detecting a rollover condition in a vehicle as recited in claim 64, wherein said safing criteria is satisfied if at least one of a magnitude of said measure of lateral acceleration exceeds an third acceleration threshold at a first point of time following said time of inception, and a magnitude of said measure of angular velocity exceeds a third angular velocity threshold at a second point of time following said time of inception, wherein said first point of time and said second point of time are arbitrary with respect to one another.

66. A method of providing for detecting a rollover condition in a vehicle as recited in claim 64, wherein the operation of detecting the rollover condition is further responsive to whether said safing criteria is satisfied.

67. A method of providing for detecting a rollover condition in a vehicle as recited in claim 32, further comprising providing for controlling an activation of a safety restraint system responsive to detection of a rollover condition.

68. A method of providing for detecting a rollover condition in a vehicle as recited in claim 66, further comprising providing for controlling an activation of a safety restraint system responsive to detection of a rollover condition.

69. A method of providing for detecting a rollover condition in a vehicle as recited in claim 32, further comprising providing for recalibrating at least one of an acceleration sensor that provides said measure of lateral acceleration and an angular velocity sensor that provides said measure of angular velocity responsive to at least one of a magnitude of said measure of angular velocity continuously being greater than a fourth angular velocity threshold for more than a fifth time period threshold, a magnitude of said measure of angle being continuously greater than an angle threshold for more than a sixth time period threshold, and a magnitude of said measure of lateral acceleration being continuously greater than a fourth acceleration threshold for more than a seventh time period threshold.

70. A method of providing for detecting a rollover condition in a vehicle as recited in claim 32, further comprising providing for recalibrating at least one of an acceleration sensor that provides said measure of lateral acceleration and an angular velocity sensor that provides said measure of angular velocity responsive to said exit criteria being consecutively satisfied more than a threshold number of occurrences.

\* \* \* \* \*

UNITED STATES PATENT AND TRADEMARK OFFICE
CERTIFICATE OF CORRECTION

PATENT NO.   : 6,529,811 B2                                                Page 1 of 4
DATED        : March 4, 2003
INVENTOR(S)  : W. Todd Watson et al.

It is certified that error appears in the above-identified patent and that said Letters Patent is hereby corrected as shown below:

Drawings,
Fig. 8c, (item "b."), "$D(\tilde{\omega}_x)$" should be changed to $--D(\tilde{\omega}'_x)--$.

Column 1,
Line 18, -- of -- should be inserted after "function".

Column 2,
Line 17, a period -- . -- should be inserted after "ground".

Column 3,
Lines 11, 55 and 65, "$\omega_x(t)$" should be changed to $--\tilde{\omega}_x(t)--$.
Line 5 (item "b."), "$D(\tilde{\omega}_x)$" should be changed to $--D(\tilde{\omega}'_x)--$.

Column 4,
Lines 4, 22 and 35, "$\omega_x(t)$" should be changed to $--\tilde{\omega}_x(t)--$.
Lines 39 and 51, "sating" should be changed to -- safing -- .

Column 5,
Line 40, "$\omega_x(t)$" should be changed to $--\tilde{\omega}_x(t)--$.

Line 37, "is" should be changed to -- are --.

Column 6,
Lines 2 and 31, "$\omega_x(t)$" should be changed to $--\tilde{\omega}_x(t)--$.

Lines 3, 10, 18 and 33, "$\omega_x^{Offset}$" should be changed to $--\tilde{\omega}_x^{Offset}--$.

Lines 35 and 48, "$A'_y$" should be changed to $--\tilde{A}_y--$.

Line 36, "$\omega'_x(t) = \omega_x(t) - \omega_x^{Offset}(t)$" should be changed to $--\tilde{\omega}'_x(t) = \tilde{\omega}_x(t) - \tilde{\omega}_x^{Offset}(t)--$.

Line 41, "if the" should be changed to -- if --.
Line 53, "$\omega'_x$" should be changed to $--\tilde{\omega}'_x--$.

Column 7,
Line 27, "sating" should be changed to -- safing -- .

Lines 9 and 23, "$A'_y$" should be changed to $--\tilde{A}_y--$.
Line 13, "$\omega'_x$" should be changed to $--\tilde{\omega}'_x--$.

Column 8,
Line 37, "in" should be changed to -- is -- .

UNITED STATES PATENT AND TRADEMARK OFFICE
CERTIFICATE OF CORRECTION

PATENT NO. : 6,529,811 B2
DATED : March 4, 2003
INVENTOR(S) : W. Todd Watson et al.

It is certified that error appears in the above-identified patent and that said Letters Patent is hereby corrected as shown below:

Column 9,
Line 44, "$\omega_x(t)$" should be changed to -- $\tilde{\omega}_x(t)$ --.

Column 10,
Lines 22 and 25, "$A'_y$" should be changed to -- $\tilde{A}_y$ --.
Line 28, "1.4 g," should be changed to --1.4 g--.

Column 11,
Lines 47, 56, 58 and 67, "$A'_y$" should be changed to -- $\tilde{A}_y$ --.
Line 24, "$\omega'_x(t) = \omega_x(t) - \omega_x^{Offset}(t)$" should be changed to -- $\tilde{\omega}'_x(t) = \tilde{\omega}_x(t) - \tilde{\omega}_x^{Offset}(t)$ --.

Lines 11, 14, 22 and 48, "$\omega'_x$" should be changed -- $\tilde{\omega}'_x$ --.

Column 12,
Lines 4, 6, 11, 15, 20, 23, 42, 46, 51 and 57, "$A'_y$" should be changed to -- $\tilde{A}_y$ --.
Lines 17, 31, 34, 35, 39 40, 43, 45, 47, 49 and 56, "$\omega'_x$" should be changed to -- $\tilde{\omega}'_x$ --.
Lines 25 and 27, "$\omega'^2_x$" should be changed to -- $\tilde{\omega}'^2_x$ --;

Line 64, "tire" should be changed to --fire-- .

Column 13,
Lines 9-10, a left parenthesis ("(") should be inserted after "·", and
Line 66, ". So" should be changed to --, so--.

Column 14,
Line 2, "$\Delta t^{Mn}_{min}$" should be changed to -- $\Delta t^{M}_{min}$ --; and Line 53, -- = -- should be inserted after "B".

Column 15,
Lines 34, 39 and 49, "$A'_y$" should be changed to -- $\tilde{A}_y$ --.
Lines 43, 55 and 59, "$\omega'_x$" should be changed to -- $\tilde{\omega}'_x$ --.

Line 19, a space (" ") should be inserted before -- AND --;
Line 34, -- of the -- should be inserted after "magnitude"; and
Line 39, -- I -- should be inserted before ">".

Column 16,
Line 5, "$\omega'_x$" should be changed to -- $\tilde{\omega}'_x$ --.

Line 58, "actual" should be changed to -- actually --.

UNITED STATES PATENT AND TRADEMARK OFFICE
CERTIFICATE OF CORRECTION

PATENT NO. : 6,529,811 B2
DATED : March 4, 2003
INVENTOR(S) : W. Todd Watson et al.

It is certified that error appears in the above-identified patent and that said Letters Patent is hereby corrected as shown below:

Column 17,
Line 53 and 58, "$A'_y$" should be changed to -- $\tilde{A}'_y$ --.

Lines 55 and 58, "$\omega'_x$" should be changed to -- $\tilde{\omega}'_x$ --.

Column 18,
Lines 62 and 64, "$\omega'_x$" should be changed to -- $\tilde{\omega}'_x$ --.
Line 10, "$\theta^E(0)$" should be changed to -- $t^E(0)$ --.

Column 19,
Line 7, "$\omega'_x(t) = \omega_x(t) - \omega_x^{Offset}(t)$" should be changed to -- $\tilde{\omega}'_x(t) = \tilde{\omega}_x(t) - \tilde{\omega}_x^{Offset}(t)$ --.

Lines 5, 13, 32, 34, 37 and 48, "$\omega'_x$" should be changed to -- $\tilde{\omega}'_x$ --.

Line 26, "by and" should be changed to -- by an --; and
Line 46, -- $n^E$ -- should be inserted after "count".

Column 20,
Line 8, "$A'_y$" should be changed to -- $\tilde{A}'_y$ --.

Lines 8, 26 and 63, "$\omega'_x$" should be changed to -- $\tilde{\omega}'_x$ --.

Column 21,
Lines 8, 14, 17 (two occurrences), 30 (two occurrences), and 37, "$\omega'_x$" should be changed to -- $\tilde{\omega}'_x$ --.

Line 6, "$D(\tilde{\omega}_x)$" should be changed to -- $D(\tilde{\omega}'_x)$ --.

Lines 32 and 37, "$D(\omega'_x)$" should be changed to -- $D(\tilde{\omega}'_x)$ --; and Line 30, "in" should be deleted after "distance".

UNITED STATES PATENT AND TRADEMARK OFFICE
CERTIFICATE OF CORRECTION

PATENT NO.   : 6,529,811 B2
DATED        : March 4, 2003
INVENTOR(S)  : W. Todd Watson et al.

It is certified that error appears in the above-identified patent and that said Letters Patent is hereby corrected as shown below:

Column 22,
Line 16, "$\omega'_x$" should be changed -- $\bar{\omega}'_x$ --.
Line 16, ")" should be deleted after "$\omega'_x$";
Line 16, -- be understood -- should be inserted after "should"; and
Line 45, -- of -- should be inserted after "breadth".

Signed and Sealed this

Fourth Day of January, 2005

JON W. DUDAS
*Director of the United States Patent and Trademark Office*